(12) United States Patent
Yerramalli et al.

(10) Patent No.: US 11,889,510 B2
(45) Date of Patent: Jan. 30, 2024

(54) FRAME BASED OPERATION FOR MILLIMETER WAVE (MMWAVE) WITH RECEIVER BASED CONTENTION

(71) Applicant: QUALCOMM Incorporated, San Diego, CA (US)

(72) Inventors: Srinivas Yerramalli, Hyderabad (IN); Arumugam Chendamarai Kannan, San Diego, CA (US); Vinay Chande, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/098,303

(22) Filed: Nov. 13, 2020

(65) Prior Publication Data

US 2021/0160918 A1   May 27, 2021

Related U.S. Application Data

(60) Provisional application No. 62/940,757, filed on Nov. 26, 2019.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0048* (2013.01); *H04W 72/046* (2013.01); *H04W 72/542* (2023.01); *H04W 72/044* (2013.01)

(58) Field of Classification Search
CPC . H04W 72/14; H04W 72/085; H04W 72/044; H04L 5/0048
See application file for complete search history.

(56) References Cited

U.S. PATENT DOCUMENTS

2008/0175576 A1   7/2008  Hong et al.
2008/0254748 A1*  10/2008  Nyberg ................. H04W 16/10
                                                            455/67.11
(Continued)

FOREIGN PATENT DOCUMENTS

WO   WO-2018058634 A1   4/2018

OTHER PUBLICATIONS

Cao, T., et al., "Multi-Focus Fusion Technique on Low-Cost Camera Images for Canola Phenotyping", Sensors, vol. 18, 1887, Jun. 2018, pp. 1-17, doi:10.3390/s18061887, http://www.mdpi.com/journal/sensors.

(Continued)

*Primary Examiner* — Walter J Divito
*Assistant Examiner* — Anthony Luo
(74) *Attorney, Agent, or Firm* — Norton Rose Fulbright US LLP

(57) ABSTRACT

This disclosure provides systems, methods, and apparatus, including computer programs encoded on computer storage media, for frame based operation and medium contention procedures in wireless networks. In some aspects, devices of a wireless network may perform receiver side contention operations. To illustrate, reference signals from a receiving device may be transmitted to a transmitting device and used by the transmitting device to estimate interference for transmitter side transmissions. Such receiver side reference signals may more accurately reflect the interference profile that transmissions sent by the transmitting device will face, such as when operating in a spectrum shared with many devices. The transmitting device may utilize the beam(s) that satisfy interference criteria when receiving the reference signals to transmit data. Receiver side frame based operation may provide a more stable interference profile which enables better rate prediction, and the better rate prediction may (Continued)

increase reliability and overall network and medium throughput.

30 Claims, 16 Drawing Sheets

(51) Int. Cl.
*H04W 72/044* (2023.01)
*H04W 72/542* (2023.01)

(56) References Cited

U.S. PATENT DOCUMENTS

| | | | |
|---|---|---|---|
| 2013/0101177 A1 | 4/2013 | Yamada et al. | |
| 2015/0036476 A1* | 2/2015 | Vos | H04L 1/1887 |
| | | | 370/216 |
| 2017/0024920 A1 | 1/2017 | Zhang et al. | |
| 2017/0188205 A1* | 6/2017 | Ventura Jaume | H04L 65/4038 |
| 2017/0280468 A1* | 9/2017 | Harada | H04W 16/14 |
| 2017/0288817 A1* | 10/2017 | Cao | H04L 1/0079 |
| 2017/0331577 A1 | 11/2017 | Parkvall et al. | |
| 2018/0146506 A1 | 5/2018 | Zhang et al. | |
| 2018/0167941 A1* | 6/2018 | Zhang | H04W 72/0426 |
| 2018/0270803 A1* | 9/2018 | Kwak | H04W 74/08 |
| 2019/0090279 A1 | 3/2019 | Sun et al. | |
| 2019/0174542 A1* | 6/2019 | Lei | H04W 74/0816 |
| 2019/0342061 A1* | 11/2019 | Kim | H04W 52/346 |
| 2019/0357255 A1 | 11/2019 | Sun et al. | |
| 2019/0364518 A1* | 11/2019 | Li | H04W 52/242 |
| 2020/0145583 A1 | 5/2020 | Shanmugam et al. | |
| 2020/0366425 A1* | 11/2020 | Takeda | H04W 72/1289 |
| 2021/0076336 A1* | 3/2021 | Shen | H04W 52/365 |

OTHER PUBLICATIONS

International Search Report and Written Opinion—PCT/US2020/060623—ISA/EPO—dated Apr. 12, 2021.
Partial International Search Report—PCT/US2020/060623—ISA/EPO—dated Feb. 18, 2021.
Qualcomm Incorporated: "Full Tx Power for UL Transmissions", 3GPP Draft, R1-1912969, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1. No. Reno, USA, Nov. 18, 2019-Nov. 22, 2019, Nov. 9, 2019 (Nov. 9, 2019), XP051823731, pp. 1-13, Retrieved from the Internet: URL:https://ftp.3gpp.org/tsg_ran/WG1_RL1/TSGR1_99/Docs/R1-1912969.zip, R1-1912969 Full-Tx Power for UL transmissions.docx [retrieved on Nov. 9, 2019] p. 2, L i ne 9 p. 3, Line 21-Line 34 p. 11, Line 21-Line 28, Section 1; p. 3.

* cited by examiner

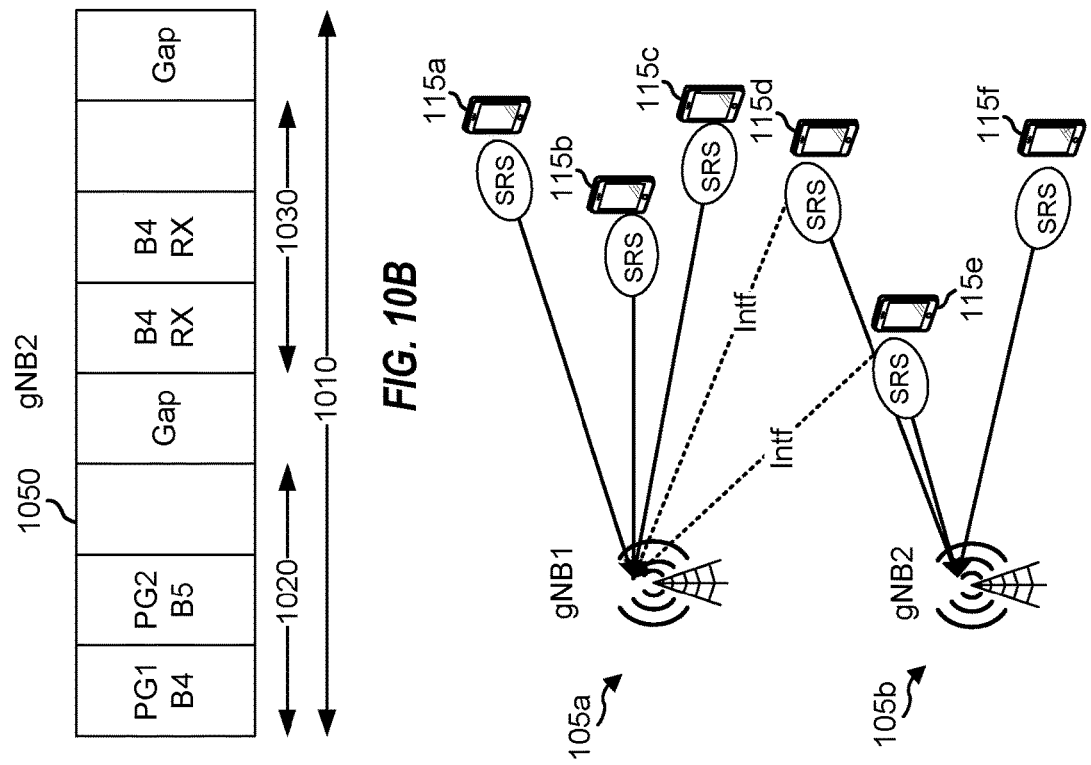
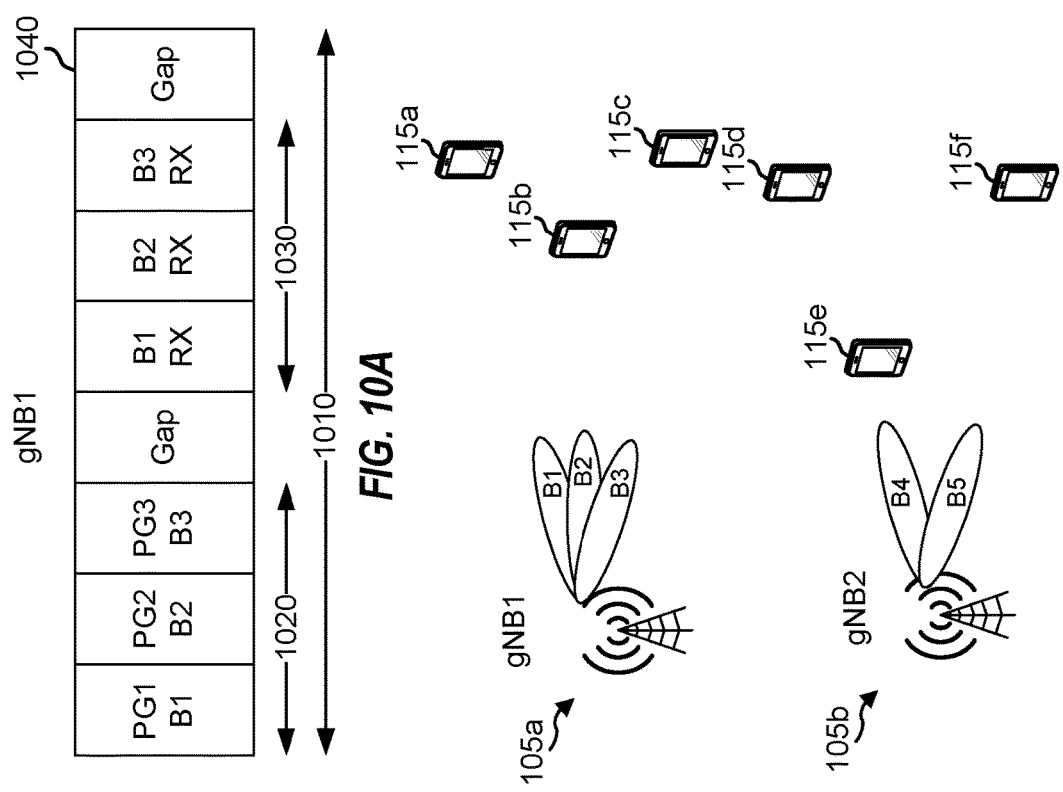

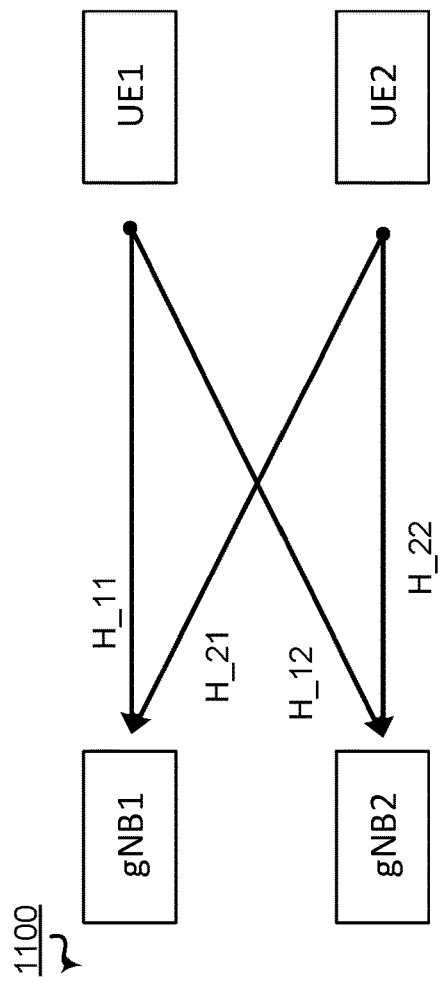
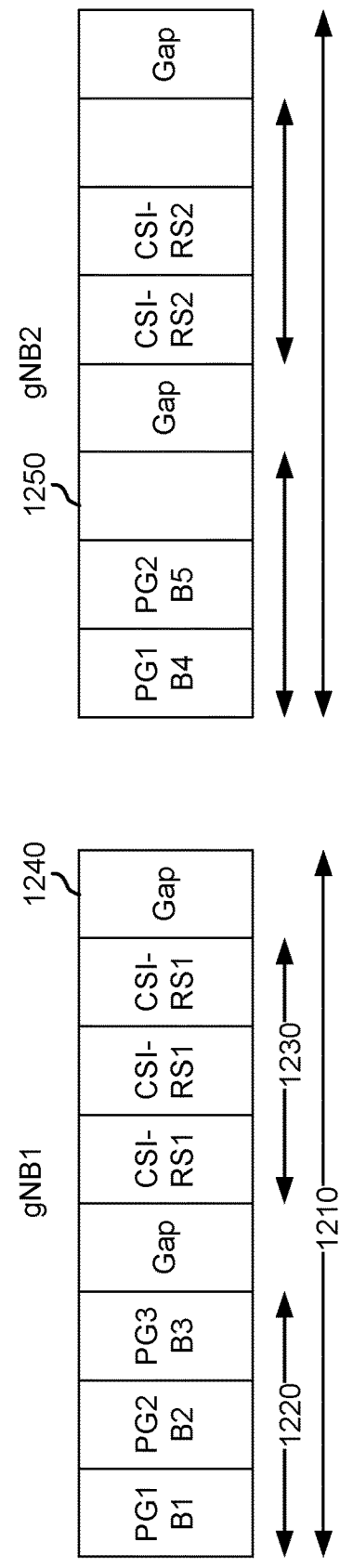
FIG. 11
FIG. 12A
FIG. 12B

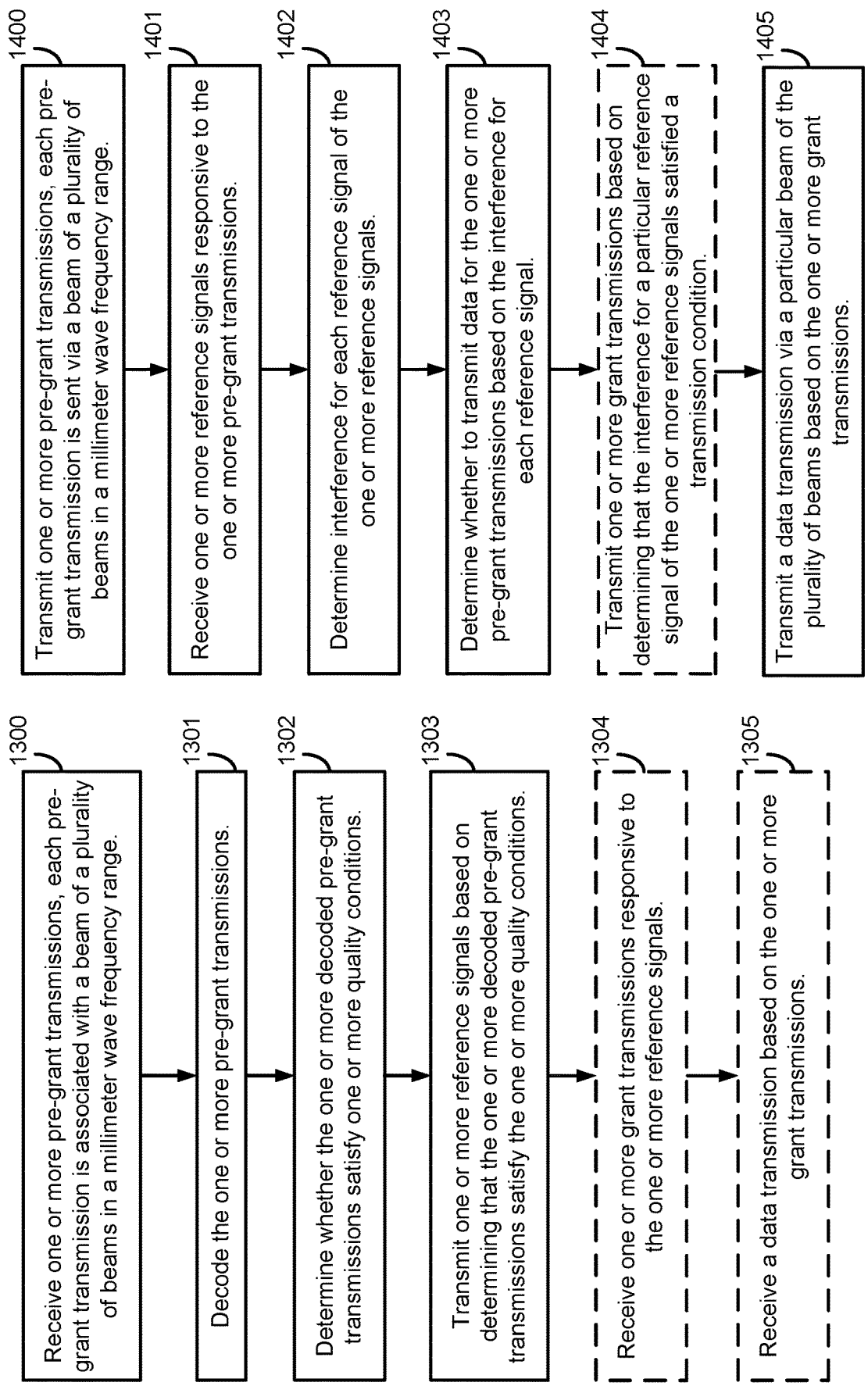

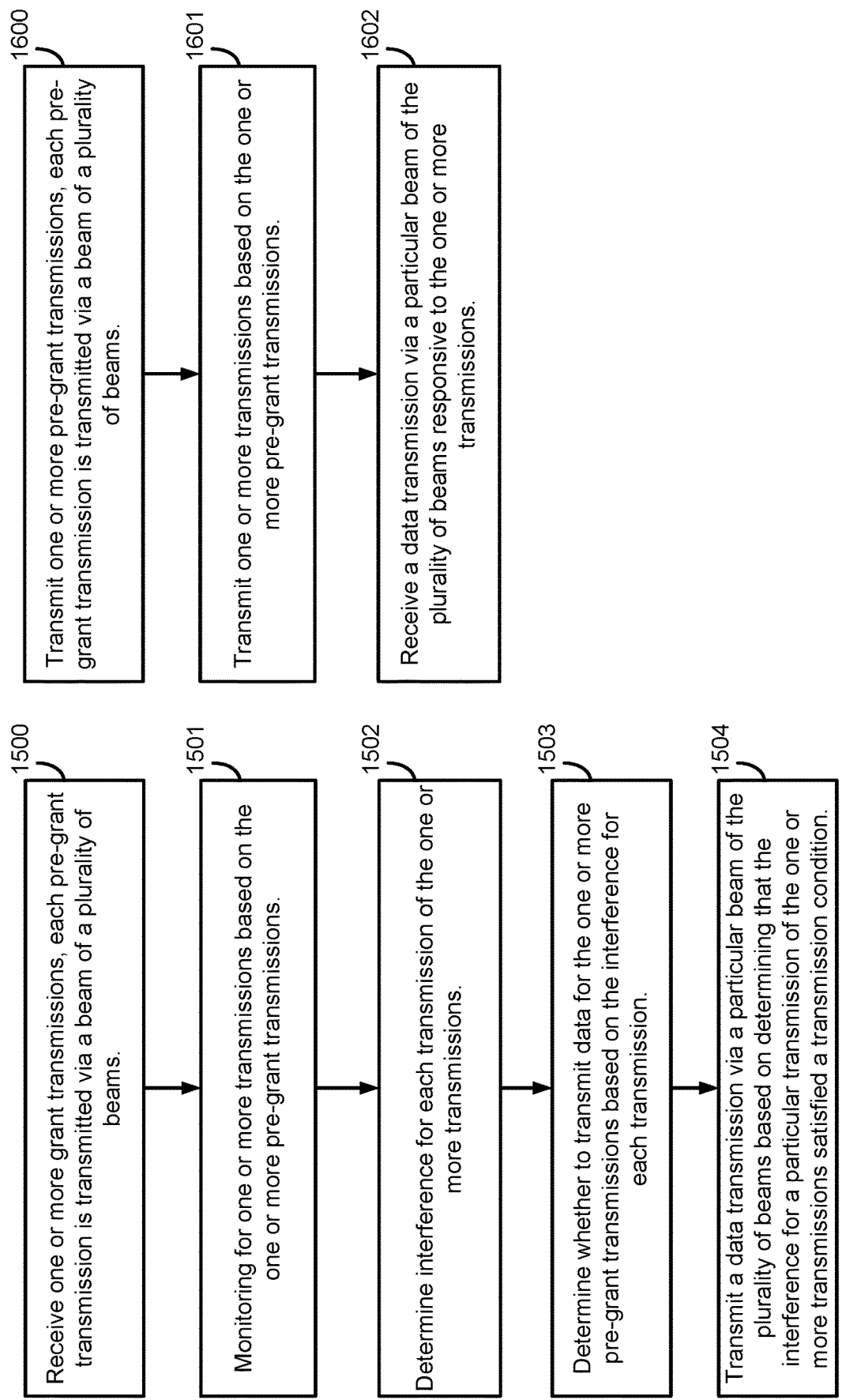

FRAME BASED OPERATION FOR MILLIMETER WAVE (MMWAVE) WITH RECEIVER BASED CONTENTION

CROSS-REFERENCE TO RELATED APPLICATIONS

This application claims the benefit of U.S. Provisional Patent Application No. 62/940,757, entitled, "FRAME BASED OPERATION FOR MILLIMETER WAVE WITH RECEIVER BASED CONTENTION," filed on Nov. 26, 2019, which is expressly incorporated by reference herein in its entirety.

TECHNICAL FIELD

Aspects of the present disclosure relate generally to wireless communication systems, and more particularly, to frame based operation and medium contention procedures.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the third ($3^{rd}$) Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink (DL) and uplink (UL). The DL (or forward link) refers to the communication link from the base station to the UE, and the UL (or reverse link) refers to the communication link from the UE to the base station. A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but also to advance and enhance the user experience with mobile communications.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication. The method includes receiving, by a user equipment (UE), one or more pre-grant transmissions, where each pre-grant transmission is sent via a beam of a plurality of beams. The method also includes decoding, by the UE, the one or more pre-grant transmissions. The method includes determining, by the UE, whether the one or more decoded pre-grant transmissions satisfies one or more quality conditions. The method further includes transmitting, by the UE, one or more transmissions based on determining that the one or more decoded pre-grant transmissions satisfies the one or more quality conditions.

In some implementations, the method can include receiving, by the UE, a data transmission responsive to the one or more transmissions. Additionally or alternatively, the method can include refraining from performing a channel sensing operation corresponding to the data transmission. In some implementations, the data transmission is received independent of a channel sensing operation.

In some implementations, the UE is operating in licensed, unlicensed or shared spectrum. Additionally or alternatively, the UE is operating in a millimeter wave frequency range.

In some implementations, the UE is operating in a frame based operation mode. Additionally or alternatively, frames of the UE are time aligned with corresponding frames of one or more network entities. In some implementations, frames of the frame based operation have a fixed duration for one or more network entities.

In some implementations, receiving the one or more pre-grant transmissions includes: receiving a first set of pre-grant transmissions from a first network entity; and receiving a second set of pre-grant transmissions from a second network entity. In some such implementations, the first set of pre-grant transmission are received via corresponding downlink beams of the first network entity.

In some implementations, the one or more pre-grant transmissions include UE identifiers (UE-IDs), the UE-IDs configured to indicate an intended UE of the one or more pre-grant messages. Additionally or alternatively, the one or more pre-grant transmissions include or correspond to Physical Downlink Control Channel (PDCCH) transmissions. In some implementations, the one or more pre-grant transmissions include a demodulation reference signal (DMRS).

In some implementations, the one or more transmissions include or correspond to reference signal transmissions. In some such implementations, the reference signal transmissions include or correspond to sounding reference signal (SRS) transmissions, each SRS transmission including a UE specific SRS. Additionally or alternatively, each SRS transmissions is transmitted via a particular uplink beam of a plurality of uplink beams.

In some implementations, the one or more transmissions include or correspond to physical channel transmissions. In some such implementations, the physical channel transmissions include a DMRS.

In some implementations, the one or more quality conditions include or correspond to a signal-to-noise ratio (SINR), a received signal reference power (RSRP), an energy metric, or a combination thereof.

In some implementations, the method can include receiving, by the UE, a data transmission responsive to the one or more transmissions, where the data transmission is received based on the one or more reference signal transmissions satisfying one or more conditions.

In some implementations, the one or more conditions correspond to an interference RSRP condition, and a network entity does not transmit data when an interference RSRP is greater than or equal to a threshold.

In some implementations, the one or more conditions correspond to a power adjusted interference strength RSRP condition, and the network entity does not transmit data when a power adjusted interference RSRP is greater than or equal to a threshold.

In some implementations, the UE is operating in a full power transmission mode. In some such implementations, the method can include transmitting, by the UE, power class information, nominal transmit power information, or both.

In some other implementations, the UE is operating in a power control mode. In some such implementations, the method can include transmitting, by the UE, current power headroom information. Additionally or alternatively, the method can include transmitting, by the UE, power headroom information. In some implementations, the power headroom information is transmitted via an uplink control channel or an uplink data channel.

In some implementations, the method can include calculating, by the UE, the power headroom information based on a power usage of a current band and independent of a power usage on other bands.

In some implementations, the one or more pre-grant transmissions are received from a first network entity for a first frame, and the method can further include: receiving, by the UE, one or more second pre-grant transmissions from the first network entity for a second frame; determining, by the UE, whether to transmit one or more second transmissions to the first network entity based on whether the one or more second pre-grant transmissions satisfy the one or more quality conditions; and refraining, by the UE, from transmitting the one or more second transmissions to the first network entity based on the one or more second pre-grant transmissions failing to satisfy the one or more quality conditions.

In some implementations, the method can include: receiving, by the UE, one or more third pre-grant transmissions from a second network entity for the second frame; determining, by the UE, whether to transmit one or more third transmissions to the second network entity based on whether the one or more third pre-grant transmissions satisfy the one or more quality conditions; and transmitting, by the UE, the one or more third transmissions to the second network entity based on the one or more third pre-grant transmissions satisfying the one or more quality conditions.

In some implementations, the one or more pre-grant transmissions are received from a first network entity for a first frame, and the method can further include: receiving, by the UE, one or more second pre-grant transmissions from the first network entity for a second frame; transmitting, by the UE, one or more second transmissions to the first network entity based on whether the one or more second pre-grant transmissions satisfy the one or more quality conditions; and monitoring, by the UE, for a second data transmission from the first network entity during the second frame, where no data is received from the first network entity during the second frame.

In some implementations, the one or more pre-grant transmissions are received from a first network entity for a particular frame, and the method can further include: receiving, by the UE, one or more second pre-grant transmissions from a second network entity for the particular frame; transmitting, by the UE, one or more second transmissions to the second network entity based on whether the one or more second pre-grant transmissions satisfy the one or more quality conditions; and monitoring, by the UE, for a second data transmission from the second network entity during the particular frame, where no data is received from the second network entity during the particular frame.

In some implementations, the one or more pre-grant transmissions are received from a first network entity, the one or more pre-grant transmissions include downlink pre-grant transmission and uplink pre-grant transmissions, and the method can further include: monitoring, by the UE, for one or more second transmissions based on the uplink pre-grant transmissions; determining, by the UE, interference for each second transmission of the one or more second transmissions; determining, by the UE, whether to transmit uplink data for each uplink pre-grant transmissions based on the interference for each second transmission; and transmitting, by the UE, second data transmissions via corresponding beams based on determining that the interference satisfied a transmission condition.

In some implementations, the method can include determining interference based on a reference signal of each second transmission.

In some implementations, the method can include, prior to receiving the one or more pre-grant transmission, performing, by the UE, a channel sensing operation.

In some implementations, the method can include, prior to receiving the one or more pre-grant transmissions, transmitting, by the UE, a capabilities message indicating that the UE is configured for frame based operation in unlicensed spectrum for millimeter wave frequency ranges.

In some implementations, the method can include, prior to receiving the one or more pre-grant transmissions, receiving, by the UE, a configuration message from a networking entity indicating a frame based operation mode.

In some implementations, the method can include, prior to receiving the one or more pre-grant transmissions, receiving, by the UE, a configuration message from a networking entity indicating a particular type of frame based operation mode.

In some implementations, the method can include, prior to receiving the one or more pre-grant transmissions, receiving, by the UE, a second configuration message from the networking entity indicating a second particular frame based operation mode.

Another innovative aspect of the subject matter described in this disclosure can be implemented in an apparatus configured for wireless communication. The apparatus includes at least one processor and a memory coupled to the at least one processor. The at least one processor is configured to receive, by a UE, one or more pre-grant transmissions, where each pre-grant transmission is sent via a beam of a plurality of beams. The at least one processor is also configured to decode, by the UE, the one or more pre-grant transmissions. The at least one processor is configured to determine, by the UE, whether the one or more decoded pre-grant transmissions satisfies one or more quality conditions. The at least one processor is further configured to transmit, by the UE, one or more transmissions based on determining that the one or more decoded pre-grant transmissions satisfies the one or more quality conditions.

In some implementations, the apparatus is configured to perform a method as in any of the implementations described above.

Another innovative aspect of the subject matter described in this disclosure can be implemented in an apparatus configured for wireless communication. The apparatus includes means for receiving, by a UE, one or more pre-grant transmissions, where each pre-grant transmission is sent via a beam of a plurality of beams. The apparatus also includes means for decoding, by the UE, the one or more pre-grant transmissions. The apparatus includes means for determining, by the UE, whether the one or more decoded pre-grant transmissions satisfies one or more quality conditions. The apparatus further includes means for transmitting, by the UE, one or more transmissions based on determining that the one or more decoded pre-grant transmissions satisfies the one or more quality conditions.

In some implementations, the apparatus is configured to perform a method as in any of the implementations described above.

Another innovative aspect of the subject matter described in this disclosure can be implemented in a non-transitory computer-readable medium storing instructions that, when executed by a processor, cause the processor to perform operations including to receive, by a UE, one or more pre-grant transmissions, where each pre-grant transmission is sent via a beam of a plurality of beams and to decode, by the UE, the one or more pre-grant transmissions. The operations also include to determine, by the UE, whether the one or more decoded pre-grant transmissions satisfies one or more quality conditions. The operations further include to transmit, by the UE, one or more transmissions based on determining that the one or more decoded pre-grant transmissions satisfies the one or more quality conditions.

In some implementations, the processor is configured to perform a method as in any of the implementations described above.

Another innovative aspect of the subject matter described in this disclosure can be implemented in a method of wireless communication. The method includes transmitting, by a network entity, one or more pre-grant transmissions, where each pre-grant transmission is transmitted via a beam of a plurality of beams. The method also includes receiving, by the network entity, one or more transmissions responsive to the one or more pre-grant transmissions. The method includes determining, by the network entity, interference for each transmission of the one or more transmissions. The method also includes determining, by the network entity, whether to transmit data for the one or more pre-grant transmissions based on the interference for each transmission. The method further includes transmitting, by the network entity, a data transmission via a particular beam of the plurality of beams based on determining that the interference for a particular transmission of the one or more transmissions satisfied a transmission condition.

In some implementations, determining the interference for each reference signal transmission includes: generating a beam interference value for a corresponding beam of each reference signal transmission of the one or more reference signal transmissions; comparing the beam interference values to a beam interference threshold; and determining whether to transmit data via a particular beam based on the corresponding beam interference value exceeding the beam interference threshold.

In some implementations, generating the beam interference value includes multiplying a transmission power and a link gain to estimate the beam interference value.

In some implementations, generating the beam interference value includes: determining an adjusted transmission power based on a transmission power setting and power headroom information; and multiplying the adjusted transmission power and a link gain to estimate the beam interference value, where the beam interference value is an adjusted strength of the interference RSRP.

In some implementations, transmitting, by the network entity, the one or more second reference signal transmissions includes transmitting a particular reference signal via each beam of a plurality of beams.

In some implementations, the network entity is operating in a time-division multiplexing (TDM) mode, and the method can include: receiving, by the network entity, timing information from a second network entity indicating occupied transmission time of a particular frame; and transmitting, by the network entity, data during another period of time of the particular frame.

In some implementations, the method can include refraining, by the network entity, from transmitting data during the occupied transmission time of the particular frame.

In some implementations, the method can include: transmitting, by the network entity, a request message to a second network entity indicating a request for power headroom information; and receiving, by the network entity, a response message from the second network entity indicating the power headroom information.

In some implementations, the method can include determining, by the network entity, type information indicating a type or class of UE; and retrieving, by the network entity, power headroom information based on the type information.

In some implementations, the method can include transmitting, by the network entity, frame configuration information indicating a transmission direction for each slot of one or more frames.

In some implementations, the method can include transmitting, by the network entity, dynamic frame configuration information indicating a transmission direction preference for each slot of a particular frame.

In some implementations, the method can include, prior to transmitting the one or more pre-grant transmission operations, performing, by the network entity, a channel sensing operation.

In some implementations, the method can include refraining, by the network entity, from performing a channel sensing operation corresponding to the data transmission. Additionally or alternatively, the data transmission is transmitted independent of a channel sensing operation.

In some implementations, the network entity is operating in licensed, unlicensed, or shared spectrum. Additionally or alternatively, the network entity is operating in a millimeter wave frequency range.

In some implementations, the network entity is operating in a frame based operation mode. Additionally or alternatively, frames of the network entity are time aligned with corresponding frames of one or more network entities. In some implementations, frames of the frame based operation have a fixed duration for one or more network entities.

In some implementations, the one or more pre-grant transmissions include UE-IDs, the UE-IDs configured to indicate an intended UE of the one or more pre-grant messages.

In some implementations, the one or more pre-grant transmissions include or correspond to PDCCH transmissions. Additionally or alternatively, the one or more pre-grant transmissions include a DMRS.

In some implementations, the one or more transmissions include or correspond to reference signal transmissions. In some such implementations, the reference signal transmissions include or correspond to SRS transmissions, each SRS transmission including a UE specific SRS. Additionally or alternatively, each SRS transmissions is transmitted via a particular uplink beam of a plurality of uplink beams.

In some implementations, the one or more transmissions include or correspond to physical channel transmissions. In some such implementations, the physical channel transmissions include a DMRS.

Another innovative aspect of the subject matter described in this disclosure can be implemented in an apparatus configured for wireless communication. The apparatus includes at least one processor and a memory coupled to the at least one processor. The at least one processor is configured to transmit, by a network entity, one or more pre-grant transmissions, where each pre-grant transmission is transmitted via a beam of a plurality of beams. The at least one processor is also configured to receive, by the network entity, one or more transmissions responsive to the one or more pre-grant transmissions. The at least one processor is configured to determine, by the network entity, interference for each transmission of the one or more transmissions. The at least one processor is also configured to determine, by the network entity, whether to transmit data for the one or more pre-grant transmissions based on the interference for each transmission. The at least one processor is further configured to transmit, by the network entity, a data transmission via a particular beam of the plurality of beams based on determining that the interference for a particular transmission of the one or more transmissions satisfied a transmission condition.

In some implementations, the apparatus is configured to perform a method as in any of the implementations described above.

Another innovative aspect of the subject matter described in this disclosure can be implemented in an apparatus configured for wireless communication. The apparatus includes means for transmitting, by a network entity, one or more pre-grant transmissions, where each pre-grant transmission is transmitted via a beam of a plurality of beams. The apparatus also includes means for receiving, by the network entity, one or more transmissions responsive to the one or more pre-grant transmissions. The apparatus includes means for determining, by the network entity, interference for each transmission of the one or more transmissions. The apparatus also includes means for determining, by the network entity, whether to transmit data for the one or more pre-grant transmissions based on the interference for each transmission. The apparatus further includes means for transmitting, by the network entity, a data transmission via a particular beam of the plurality of beams based on determining that the interference for a particular transmission of the one or more transmissions satisfied a transmission condition.

In some implementations, the apparatus is configured to perform a method as in any of the implementations described above.

Another innovative aspect of the subject matter described in this disclosure can be implemented in a non-transitory computer-readable medium storing instructions that, when executed by a processor, cause the processor to perform operations including to transmit, by a network entity, one or more pre-grant transmissions, where each pre-grant transmission is transmitted via a beam of a plurality of beams. The operations also include to receive, by the network entity, one or more transmissions responsive to the one or more pre-grant transmissions. The operations include to determine, by the network entity, interference for each transmission of the one or more transmissions. The operations also include to determine, by the network entity, whether to transmit data for the one or more pre-grant transmissions based on the interference for each transmission. The operations further include to transmit, by the network entity, a data transmission via a particular beam of the plurality of beams based on determining that the interference for a particular transmission of the one or more transmissions satisfied a transmission condition.

In some implementations, the processor is configured to perform a method as in any of the implementations described above.

Another innovative aspect of the subject matter described in this disclosure can be implemented in a method of wireless communication. The method includes receiving, by a UE, one or more pre-grant transmissions. The method also includes monitoring, by the UE, for one or more transmissions based on the one or more pre-grant transmissions. The method includes determining, by the UE, interference for each second reference signal transmission of the one or more second reference signal transmissions. The method also includes determining, by the UE, whether to transmit uplink data for the one or more pre-grant transmissions based on the interference for each second reference signal transmission. The method further includes transmitting, by the UE, data transmissions via corresponding beams based on determining that the interference satisfied a transmission condition.

Another innovative aspect of the subject matter described in this disclosure can be implemented in a method of wireless communication. The method includes transmitting, by a network entity, one or more pre-grant transmissions via a beam of a plurality of beams. The method also includes transmitting, by the network entity, one or more transmissions based on the one or more pre-grant transmissions. The method further includes receiving, by the network entity, a data transmission via a beam of the plurality of beams responsive to the one or more transmissions.

Another innovative aspect of the subject matter described in this disclosure can be implemented in a method of wireless communication. The method includes receiving, by a UE, one or more pre-grant transmissions. The method also includes transmitting, by the UE, one or more first reference signal transmissions based on the one or more pre-grant transmissions. The method includes receiving, by the UE, one or more second reference signal transmissions based on the one or more pre-grant transmissions. The method also includes determining, by the UE, interference for each second reference signal transmission of the one or more second reference signal transmissions. The method includes determining, by the UE, whether to transmit uplink data for the one or more pre-grant transmissions based on the interference for each second reference signal transmission. The method also includes receiving, by the UE, downlink data transmissions corresponding to the one or more first reference signal transmissions. The method further includes transmitting, by the UE, uplink data transmissions via corresponding beams based on determining that the interference satisfied a transmission condition.

In some implementations, determining whether to transmit the uplink data for the one or more pre-grant transmissions based on the interference includes: generating a beam interference value for a corresponding beam of each reference signal transmission of the one or more reference signal transmissions; comparing the beam interference values to a beam interference threshold; and determining whether to transmit data via a particular beam based on the corresponding beam interference value exceeding the beam interference threshold.

In some implementations, one or more second reference signal transmissions include or correspond to channel state information (CSI) reference signals (CSI-RS) transmissions.

Another innovative aspect of the subject matter described in this disclosure can be implemented in a method of wireless communication. The method includes transmitting, by a network entity, one or more pre-grant transmissions via a beam of a plurality of beams.

The method also includes receiving, by the network entity, one or more first reference signal transmissions based on the one or more pre-grant transmissions. The method includes transmitting, by the network entity, one or more second reference signal transmissions based on the one or more pre-grant transmissions. The method also includes determining, by the network entity, interference for each first reference signal transmission of the one or more first reference signal transmissions. The method includes determining, by the network entity, whether to transmit uplink data for the one or more pre-grant transmissions based on the interference for each first reference signal transmission. The method also includes transmitting, by the network entity, uplink data transmissions via corresponding beams based on determining that the interference satisfied a transmission condition. The method further includes receiving, by the network entity, downlink data transmissions responsive to the one or more second reference signal transmissions.

In some implementations, the one or more pre-grant transmissions are transmitted to a plurality of UEs, and the method can include: receiving, by the network entity, one or more first reference signal transmissions, each reference signal transmission including a UE specific reference signal; identifying a first UE of the plurality of UEs based on a first UE specific reference signal; and identifying a second UE of the plurality of UEs based on a second UE specific reference signal.

Another innovative aspect of the subject matter described in this disclosure can be implemented in a method of wireless communication. The method includes receiving, by a UE, a first pre-grant transmission, the first pre-grant transmission including a DMRS. The method also includes monitoring, by the UE, for one or more second pre-grant transmissions based on the DMRS of the first pre-grant transmission, the one or more second pre-grant transmission including a plurality of second DMRSs. The method includes determining, by the UE, interference for based on the DMRS, the plurality of second DMRSs, or a combination thereof. The method also includes determining, by the UE, whether to transmit uplink data for the one or more pre-grant transmissions based on the interference. The method further includes transmitting, by the UE, data transmissions via corresponding beams based on determining that the interference satisfied a transmission condition.

In some implementations, the method can include: receiving, by the UE, a third pre-grant transmission, the third pre-grant transmission including a third DMRS; determining, by the UE, that the UE is not scheduled for transmissions for a particular time period based on decoding the third DMRS; and refraining, by the UE, from monitoring for transmissions or sending transmissions based on determining that the UE is not scheduled for the transmissions for the particular time period.

In some implementations, the method can include entering, by the UE, a low power mode or sleep mode based on determining that the UE is not scheduled for the transmissions for the particular time period.

In some implementations, the method can include determining, by the UE, to monitor for the one or more second pre-grant transmissions based on the DMRS indicating that the UE is scheduled to transmit or receive data for a particular time period.

Another innovative aspect of the subject matter described in this disclosure can be implemented in a method of wireless communication. The method includes receiving one or more pre-grant transmissions, where each pre-grant transmission is associated with a beam of a plurality of beams, and where the plurality of beams are in a millimeter wave (mmWave) frequency range. The method also includes decoding the one or more pre-grant transmissions and determining whether the one or more decoded pre-grant transmissions satisfy one or more quality conditions. The method includes transmitting one or more reference signals based on determining that the one or more decoded pre-grant transmissions satisfy the one or more quality conditions. The method further includes receiving one or more grant transmissions responsive to the one or more reference signals, and receiving a data transmission based on the one or more grant transmissions.

In some implementations, the method can include refraining from performing a channel sensing operation corresponding to the data transmission.

In some implementations, the UE is operating in unlicensed or shared spectrum.

In some implementations, the UE is operating in a frame based operation mode, frames of the UE are time aligned with corresponding frames of one or more network entities, and frames of the frame based operation mode have a fixed duration for the one or more network entities.

In some implementations, receiving the one or more pre-grant transmissions includes: receiving a first set of pre-grant transmissions from a first network entity; and receiving a second set of pre-grant transmissions from a second network entity.

In some implementations, the first set of pre-grant transmission are received via corresponding downlink beams for the first network entity.

In some implementations, the one or more pre-grant transmissions include UE-IDs, the UE-IDs configured to indicate an intended UE of the one or more pre-grant transmissions.

In some implementations, the one or more pre-grant transmissions include or correspond to PDCCH transmissions, and each of the PDCCH transmissions include a DMRS.

In some implementations, the one or more reference signals include or correspond to SRS transmissions, each SRS transmission including a UE specific SRS.

In some implementations, each SRS transmission is transmitted via a corresponding uplink beam of a plurality of uplink beams.

Another innovative aspect of the subject matter described in this disclosure can be implemented in an apparatus configured for wireless communication. The apparatus includes at least one processor and a memory coupled to the at least one processor. The at least one processor is configured to receive one or more pre-grant transmissions, where each pre-grant transmission is associated with a beam of a plurality of beams, and where the plurality of beams are in a mmWave frequency range. The at least one processor is also configured to decode the one or more pre-grant transmissions and determine whether the one or more decoded pre-grant transmissions satisfy one or more quality conditions. The at least one processor is configured to transmit one or more reference signals based on determining that the one or more decoded pre-grant transmissions satisfy the one or more quality conditions. The at least one processor is further configured to receive one or more grant transmissions responsive to the one or more reference signals, and receive a data transmission based on the one or more grant transmissions.

In some implementations, the one or more quality conditions include or correspond to a SINR condition, a RSRP condition, an energy metric condition, or a combination thereof.

In some implementations, the one or more quality conditions correspond to an interference RSRP condition, and where a network entity does not transmit data when an interference RSRP is greater than or equal to a threshold.

In some implementations, the one or more quality conditions correspond to a power adjusted interference strength RSRP condition, and a network entity does not transmit data when a power adjusted interference RSRP is greater than or equal to a threshold.

In some implementations, the at least one processor is further configured to transmit current power headroom information, the current power headroom information configured to enable network interference determination.

In some implementations, the one or more pre-grant transmissions are received from a first network entity for a first frame, and the at least one processor is further configured to: receive one or more second pre-grant transmissions from the first network entity for a second frame; determine whether to transmit one or more second reference signals to the first network entity based on whether the one or more second pre-grant transmissions satisfy the one or more quality conditions; and refrain from transmitting the one or more second reference signals to the first network entity based on the one or more second pre-grant transmissions failing to satisfy the one or more quality conditions.

In some implementations, the at least one processor is further configured to: receive one or more third pre-grant transmissions from a second network entity for the second frame; determine whether to transmit one or more third reference signals to the second network entity based on whether the one or more third pre-grant transmissions satisfy the one or more quality conditions; and transmit the one or more third reference signals to the second network entity based on the one or more third pre-grant transmissions satisfying the one or more quality conditions.

In some implementations, the one or more pre-grant transmissions are received from a first network entity for a particular frame, and the at least one processor is further configured to: receive one or more second pre-grant transmissions from a second network entity for the particular frame; transmit one or more second reference signals to the second network entity based on whether the one or more second pre-grant transmissions satisfy the one or more quality conditions; and monitor for a second data transmission from the second network entity during the particular frame, where no data is received from the second network entity during the particular frame.

In some implementations, the one or more pre-grant transmissions are received from a first network entity for a particular frame, and the at least one processor is further configured to: receive one or more second pre-grant transmissions from a second network entity for the particular frame; and refrain from transmitting second reference signals to the second network entity based on the one or more second pre-grant transmissions failing to satisfy the one or more quality conditions.

In some implementations, the one or more pre-grant transmissions are received from a first network entity, the one or more pre-grant transmissions include downlink pre-grant transmission and uplink pre-grant transmissions, and the at least one processor is further configured to: monitor for one or more second reference signals based on the uplink pre-grant transmissions; determine interference for each second reference signal of the one or more second reference signals; determine whether to transmit uplink data for each uplink pre-grant transmissions based on the interference for each second reference signal; and transmit second data transmissions via corresponding beams based on determining that the interference satisfied a transmission condition.

In some implementations, the one or more second reference signal include or correspond to downlink reference signal transmissions, and the downlink reference signal transmissions include CSI-RS transmissions.

Another innovative aspect of the subject matter described in this disclosure can be implemented in a method of wireless communication by an apparatus. The method includes transmitting one or more pre-grant transmissions, where each pre-grant transmission is sent via a beam of a plurality of beams, and where the plurality of beams are in a mmWave frequency range. The method also includes receiving one or more reference signals responsive to the one or more pre-grant transmissions. The method includes determining interference for each reference signal of the one or more reference signals, and determining whether to transmit data for the one or more pre-grant transmissions based on the interference for each reference signal. The method includes transmitting one or more grant transmissions based on determining that the interference for a particular reference signal of the one or more reference signals satisfied a transmission condition. The method further includes transmitting a data transmission via a particular beam of the plurality of beams based on the one or more grant transmissions.

In some implementations, determining the interference for each reference signal includes generating a beam interference value for a corresponding beam of each reference signal transmission of the one or more reference signals; comparing the beam interference values to a beam interference threshold; and determining whether to transmit the data via the particular beam based on the corresponding beam interference value exceeding the beam interference threshold.

In some implementations, generating the beam interference value includes multiplying a transmission power of a UE and a link gain between the apparatus and the UE to estimate the beam interference value.

In some implementations, generating the beam interference value includes: determining an adjusted transmission power based on a transmission power setting of a UE and power headroom information of the UE; and multiplying the adjusted transmission power and a link gain between the apparatus and the UE to estimate the beam interference value, where the beam interference value is an adjusted RSRP interference value.

Another innovative aspect of the subject matter described in this disclosure can be implemented in an apparatus configured for wireless communication. The apparatus includes at least one processor and a memory coupled to the at least one processor. The at least one processor is configured to transmit one or more pre-grant transmissions, where each pre-grant transmission is sent via a beam of a plurality of beams, and where the plurality of beams are in a mmWave frequency range; receive one or more reference signals responsive to the one or more pre-grant transmissions. The at least one processor is also configured to determine interference for each reference signal of the one or more reference signals and determine whether to transmit data for the one or more pre-grant transmissions based on the interference for each reference signal The at least one processor is configured to transmit one or more grant transmissions based on determining that the interference for a particular reference signal of the one or more reference signals satisfied a transmission condition. The at least one processor is further configured to transmit a data transmission via a particular beam of the plurality of beams based on the one or more grant transmissions.

In some implementations, the apparatus is a first network entity operating in a time-division multiplexing (TDM) mode, and the at least one processor is further configured to: receive timing information from a second network entity indicating occupied transmission time of a particular frame; transmit second data during another period of time of the particular frame; and refrain from transmitting the second data during the occupied transmission time of the particular frame.

In some implementations, the at least one processor is further configured to transmit frame configuration information indicating a transmission direction for each slot of one or more frames or dynamic frame configuration information indicating a transmission direction preference for each slot of a particular frame.

In some implementations, the at least one processor is further configured to refrain from performing a channel sensing operation corresponding to the data transmission.

In some implementations, the apparatus is a network entity operating in a frame based operation mode, frames of the network entity are time aligned with corresponding frames of one or more other network entities, and frames of the frame based operation mode have a fixed duration for the one or more other network entities.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 10A-10D are diagrams illustrating an example of downlink frame based operation.

FIG. 11 is a block diagram illustrating an example of beam interference.

FIGS. 12A-12D are diagrams illustrating examples of uplink frame based operation.

FIG. 13 is a flowchart illustrating example blocks executed by a UE.

FIG. 14 is a flowchart illustrating example blocks executed by a network entity.

FIG. 15 is a flowchart illustrating another example of blocks executed by a UE.

FIG. 16 is a flowchart illustrating another example of blocks executed by a network entity.

Like reference numbers and designations in the various drawings indicate like elements.

DETAILED DESCRIPTION

Figure 1:
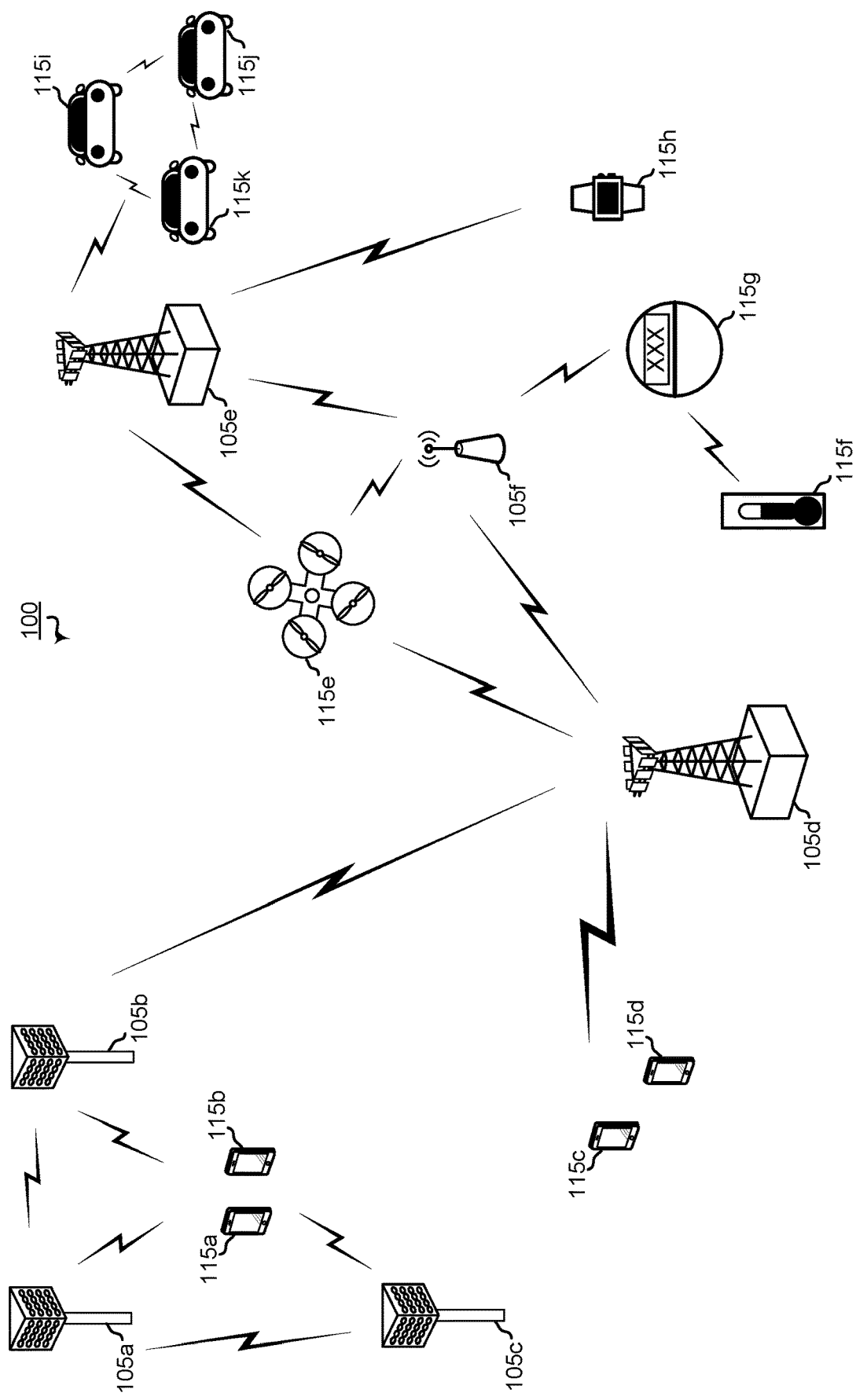
FIG. 1 is a block diagram illustrating details of an example wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Wireless communications systems operated by different network entities may share spectrum. In some instances, two network entities may be configured to send transmissions to multiple User Equipments (UEs). Thus, in order to enable network entities to use more of the shared spectrum, and in order to mitigate interfering communications between the different network entities, devices may contend for the medium to avoid collisions and interference and enable successful reception and decoding. Contending for the medium is generally referred to as a contention process or performing contention operations.

For example, multiple network entities and UEs may perform channel sensing procedures, such as listen-before-talk (LBT) procedures, before transmitting. As another example, a device or devices may signal their intent to transmit data during a particular time period. As yet another example, devices may utilize a random amount of time before blindly transmitting or performing other conventional contention operations.

However, conventional contention procedures may not be applicable to higher frequency signals, such as the frequency range of millimeter wave (mmWave), or to directional communications. For example, a narrowness and directional nature of the beams used with higher frequency signals and next generation wireless networks may reduce interference levels and the chance of interference. Additionally, the higher frequency signals and directional communications require more power to transmit and receive. Thus, conventional contention procedures of conventional wireless networks which are designed to operate in non-millimeter wave spectrum, such as sub-6 GHz, may not be efficient enough to be practicable when applied to higher frequency signals or directional communications.

Conventional contention procedures generally operate based on transmitter side based contention operations, such as transmitter side based sensing. Transmitter side based sensing may not accurately reflect the interference caused by a particular transmission when operating in millimeter wave spectrum, using directional communications, or both. Additionally, such conventional procedures and transmitter side sensing may not reflect the actual interference caused by the transmission or its effect on transmissions of other network devices. As an alternative, receiver side confirmation based contention operations may be used to better account for the narrow beam nature of high frequency spectrum and directional communications. To illustrate, receiver side or receiver transmitted reference signals may be transmitted to a transmitting device and used by the transmitting device to estimate interference for transmitter side communications. Such receiver side reference signals may more accurately indicate or reflect the interference profile that transmissions sent by the transmitter will face when operating in a spectrum shared with many devices. In some implementations, a receiving device or devices may transmit multiple reference signals such that a transmitting device may attempt to receive the reference signals with different beams. The transmitting device may utilize the beam or beams that performed the best to receive the reference signals to transmit data.

Particular implementations of the subject matter described in this disclosure can be implemented to realize one or more of the following potential advantages. For example, by enabling receiver based contention for higher frequency signals, such as millimeter wave, a network may perform effective contention procedures more efficiently. As another example, receiver based frame based operation may provide a more stable interference profile, which may lead to better throughput caused by better rate prediction. Additionally, the network may be able to operate in a frame based operation mode in licensed and unlicensed spectrum.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface.

To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km$^2$), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps/km$^2$), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to one of ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such as the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
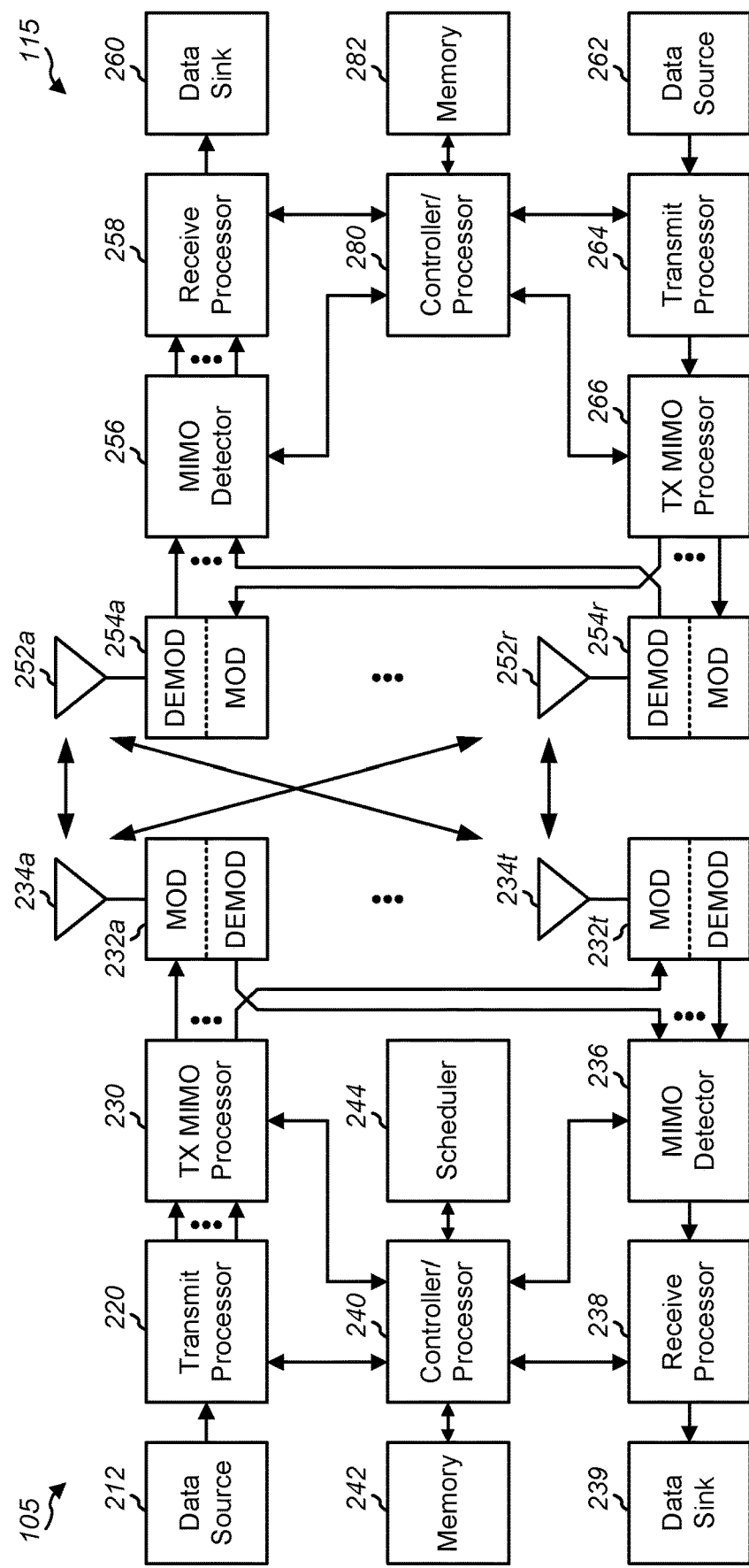
FIG. 2 is a block diagram conceptually illustrating an example design of a base station (BS) and a user equipment (UE).

FIG. 2 is a block diagram conceptually illustrating an example design of a base station (BS) 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller/processor 280. For example, to process the detected symbols, receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller/processor 280. Additionally, transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 or other processors and modules at base station 105 or controller/processor 280 or other processors and modules at UE 115 may perform or direct the execution of various processes for the techniques described herein, such as to perform or direct the execution illustrated in FIGS. 9 and 10, or other processes for the techniques described herein. Memories 242 and 282 may store data and program codes for base station 105 and UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities, such as network operators, are attempting to access a shared resource. In the 5G network 100, the base stations 105 and the UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Additionally, conventional transmitter side based sensing contention procedures may not accurately reflect the interference caused by a particular transmission when operating in millimeter wave spectrum, using directional communications, or both. Thus, such conventional procedures and transmitter side sensing may not reflect or take into account the actual interference caused by the transmission or its effect on transmissions of other network devices. As an alternative, receiver side confirmation based contention operations may be used to better account for the narrow beam nature of high frequency spectrum and directional communications and to reduce or eliminate the network overhead for medium-sensing. To illustrate, a transmit device may better estimate interference for outgoing transmissions when determining the interference based on received reference signals. The transmit device may then perform contention operations, that is determine whether or not to transmit, based on the improved interference estimations. Determining to transmit based on estimated interference at the receiving device may enable the transmit device to transmit without the overheard and latency induced by transmitter side contention operations.

Figure 3:
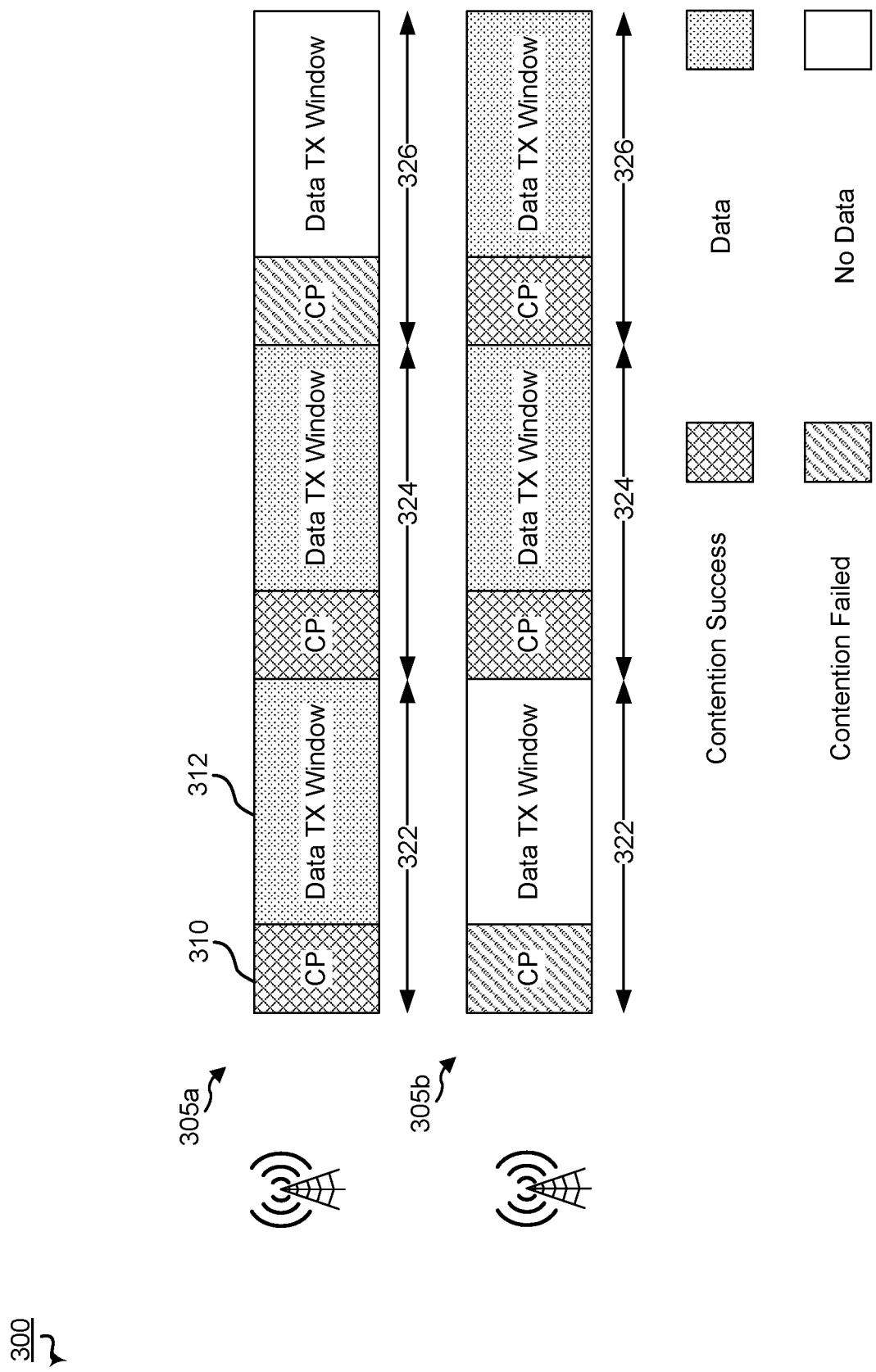
FIG. 3 is a diagram illustrating an example of frame based operation.

FIG. 3 is a diagram illustrating an example of frame based operation. Referring to FIG. 3, a timing diagram 300 is illustrated. The timing diagram 300 depicts a timing of two network entities, such as first base station 305a and second base station 305b, for three frames 322-326. During the frames 322-326, one or more devices of a network may contend for the medium. To illustrate, one or more base stations, one or more UEs, or both, may signal an intent to transmit during the frame.

As illustrated in the example of FIG. 3, each frame of the frames 322-326 includes a contention period 310 and a data transmission period 312. The contention period (CP) also may be known as or referred to as a contention window. The data transmission period 312 also may be known as or referred to as a data transmission window or a transmit opportunity (TXOP). Devices contend for the medium during the data transmission period 312 in the corresponding contention period 310.

In the example illustrated in FIG. 3, the first base station 305a and the second base station 305b contend for the medium during the contention period 310 of first frame 322. The first base station 305a is successful and transmits data, receives data, or both, during the corresponding data transmission period 312 of the first frame 322. The second base station 305b is not successful and does not transmit data or receive data during the corresponding data transmission period 312 of the first frame 322.

The first base station 305a and the second base station 305b contend for the medium during the contention period 310 of second frame 324. The first base station 305a and the second base station 305b are both successful and both transmit data, receive data, or both, during the corresponding data transmission period 312 of the second frame 324. Alternatively, both the first base station 305a and the second base station 305b may not be successful and both may refrain from transmitting data. In LBT based contention operations, one device, base station, wins the medium and all other devices refrain from transmitting, similar to outcome illustrated in the first frame 322. As compared to LBT based contention operations, some of the aspects described herein enable multiple devices to "win" the medium and transmit. For example, the features of the independent claims enable multiple devices to "win" the medium and transmit because actual interference or, receiver side interference is being used to make transmission determinations (contention decisions) instead of estimated interference or, transmitter side interference. To illustrate, with channel sensing if one device is transmitting, another device will not transmit while it detects energy in the channel. However, with receiver based contention, if multiple receiving devices are able to receive communications concurrently, then multiple transmit devices may transmit at the same time (same transmit window). Additionally, in some implementations, no device may "win" the medium and transmit.

The first base station 305a and the second base station 305b contend for the medium during the contention period 310 of third frame 326. The first base station 305a is not successful and does not transmit data or receive data during the corresponding data transmission period 312 of the third frame 326. The second base station 305b is successful and transmits data, receives data, or both, during the corresponding data transmission period 312 of the third frame 326. Although the example of FIG. 3 has been described for downlink transmission and contention by base stations only, in some other implementations the UEs may contend for the medium in addition to or in the alternative of the base stations.

The frames 322-326 of timing diagram 300 may be have a fixed period and duration. That is, each frame of the frames 322-326 occupies the same amount of time as each other frame and the frames 322-326 repeat with the same pattern, timing, or both. Additionally, or alternatively, the frames 322-326 of the different devices may be time aligned, as shown in FIG. 3. To illustrate, the first frame 322 for the first base station 305a starts and ends at the same time as the first frame 322 for the second base station 305b. Fixed period and duration frames may offer easier synchronization and reduced collisions between networks and the devices thereof. Similarly, time aligned frames may offer easier synchronization and reduced collisions between networks and the devices thereof.

Systems and methods described herein are directed to frame based operations and receiving device based contention procedures. Such operations and procedures may be applicable to unlicensed or shared spectrum and to licensed spectrum. Additionally, such operations and procedures may enable enhanced operation in high frequency spectrum, such as millimeter wave frequencies. Receiving device or side based interference estimation better accounts for the narrow beam nature of high frequency spectrum and directional communications. To illustrate, receiver side or receiver transmitted reference signals may be used by transmitting devices to estimate interference for transmitter side communications. Such receiver side reference signals may more accurately indicate or reflect the interference profile that transmissions sent by the transmitter will face when operating in a spectrum shared with many devices. With the improved interference estimations and profile, devices can more effectively transmit and receive data. Additionally, when such estimations are used for contention procedures in place of transmitter side energy sensing, multiple devices may determine that they can use the medium at the same time. Accordingly, throughput may be increased by enabling concurrent transmissions.

The frame based operations and receiving device based contention procedure may enable improved power efficiency and battery life in millimeter wave frequencies and in next generation wireless networks. Reducing or eliminating transmitter side contention operations, such as channel sensing, may reduce power consumption and may increase battery life.

Figure 4:
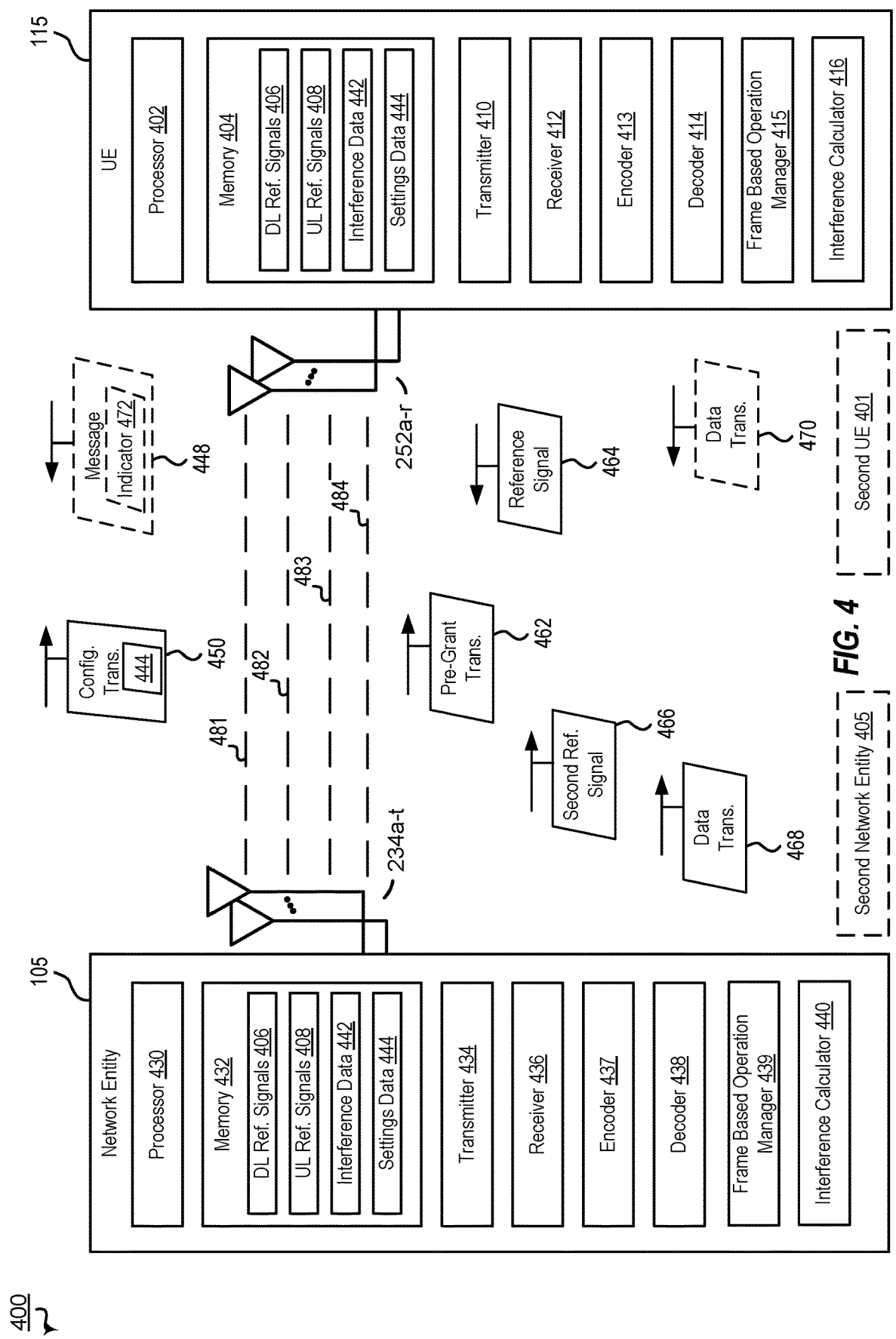
FIG. 4 is a block diagram illustrating an example of a wireless communications system that enables frame based operation.

FIG. 4 illustrates an example of a wireless communications system 400 that supports receiver side frame based operation. In some examples, wireless communications system 400 may implement aspects of wireless communication system 100. For example, wireless communications system 400 may include network entity 105 (such as base station 105), UE 115, and optionally second network entity 405 (such as second base station 105 or a second TRP of base station 105), a second UE 401, or both. Receiver side frame based operation may enable efficient frame based operation in high frequency spectrum. Reducing or eliminating transmitter side contention operations, such as channel sensing, back-off delays, and the like, may reduce network overhead and may increase throughput by reducing or eliminating unused slots and allowing devices to transmit earlier in slots. Additionally, interference based contention operations, as compared to energy based contention operations, may reduce network overhead and may increase throughput by allowing multiple devices to transmit in the same slot when the interference is deemed acceptable or does not cause reception failures.

Additionally, receiver side frame based operation provides a more stable interference profile which leads to improved rate prediction. With the directional and narrow beam nature of directional communications, receiver side reference signals provide better and more accurate interference estimations. These improved interference estimations can be used to build a more accurate interference profile that is not based on less accurate transmitter side estimations and transient interference at the transmitter. Using the more accurate and stable interference profile may enable a device to make more accurate rate predictions and use higher rates. This improved rate prediction increases throughput and reliability and reduces latency.

Network entity 105 and UE 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that sub-carrier spacing (SCS) may be equal to 15, 30, 60, or 120 kHz for some data channels. Network entity 105 and UE 115 may be configured to communicate via one or more component carriers (CCs), such as representative first CC 481, second CC 482, third CC 483, and fourth CC 484. Although four CCs are shown, this is for illustration only, as more or fewer than four CCs may be used. One or more CCs may be used to communicate a PDCCH, a Physical Downlink Shared Channel (PDSCH), a Physical Uplink Control Channel (PUCCH), or a Physical Uplink Shared Channel (PUSCH).

In some implementations, such transmissions may be scheduled by dynamic grants. In some other implementations, such transmissions may be scheduled by one or more periodic grants and may correspond to semi-persistent scheduling (SPS) grants or configured grants of the one or more periodic grants. The grants, both dynamic and periodic, may be preceded or indicated by a pre-grant transmission or a message with a UE identifier (UE-ID). In some implementations, the pre-grant transmission may include a UE-ID. The pre-grant transmission or UE-ID message may be configured to activate one or more UEs such that the UEs will transmit a first reference signal, listen/monitor for a second reference signal, or both. The pre-grant transmission or UE-ID message may be sent during a contention period, such as contention period 310, and initiate a contention procedure.

Each periodic grant may have a corresponding configuration, such as configuration parameters/settings. The periodic grant configuration may include SPS configurations and settings. Additionally, or alternatively, one or more periodic grants (such as SPS grants thereof) may have or be assigned to a CC ID, such as intended CC ID.

Each CC may have a corresponding configuration, such as configuration parameters/settings. The configuration may include bandwidth, bandwidth part, hybrid automatic repeat request (HARQ) process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC also may have corresponding management functionalities, such as, beam management, BWP switching functionality, or both. In some implementations, two or more CCs are quasi co-located, such that the CCs have the same beam or same symbol.

In some implementations, control information may be communicated via network entity 105 and UE 115. For example, the control information may be communicated using MAC-CE transmissions, RRC transmissions, DCI, transmissions, another transmission, or a combination thereof.

UE 115 includes processor 402, memory 404, transmitter 410, receiver 412, encoder 413, decoder 414, Frame Based Operation Manager 415, Interference Calculator 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 also may be configured to store downlink (DL) reference signal data 406, uplink (UL) reference signal data 408, interference data 442, settings data 444, or a combination thereof, as further described herein.

The DL reference signal data 406 includes or corresponds to downlink reference signals associated with the UE 115. To illustrate, DL reference signal data 406 may include reference signals for the UE 115, such as reference signals to be transmitted in the downlink direction. For example, a DL reference signal is transmitted by a network entity and to a UE and is used by the UE for estimating UL interference. In some implementations, the DL reference signal data 406 includes a channel state information (CSI) reference signal (CSI-RS) or a demodulation reference signal (DMRS). The UL reference signal data 408 includes or corresponds to uplink reference signals for the network entity 105, second network entity 405, or both. To illustrate, UL reference signal data 408 may include reference signals transmitted by the UE 115 and for estimating DL interference. In some implementations, the UL reference signal data 408 includes a UE specific sounding reference signal (SRS) or DMRS.

The interference data 442 includes or corresponds to data indicating one or more interference values for links associated with the UE 115. For example, the interference data 442 may include determined interference values, estimated interference values, adjusted interference values, or a combination thereof, for one or more links. In some implementations, adjusted interference values include or correspond to power headroom adjusted values. The interference data 442 may indicate interference values in both the UL and DL directions. Additionally, or alternatively, the interference data 442 includes interference thresholds. The settings data 444 includes or corresponds to data which is used by UE 115 to determine a frame based operation mode, an interference mode, a transmission type mode, etc.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode, such as encode or decode transmissions, respectively. Frame Based Operation Manager 415 may be configured to perform frame based operations for millimeter wave spectrum, licensed spectrum, unlicensed spectrum, or a combination thereof. The frame based operations may include receiver side or receiver based contention procedures. For example, the receiver side contention procedures include a receiving device sending a signal that is used to resolve access to the medium and contention procedures. Such receiver side frame based operations procedures enable frame based operation to be extended to millimeter wave and unlicensed spectrum and enables enhanced functionality as compared to transmitter side frame based operations procedures.

Interference Calculator 416 may be configured to determine or estimate interference of a link. For example, the UE 115 calculates interference for uplink transmissions, downlink transmissions, or both, between the UE 115 and a particular network entity. Details of interference determination are described further with reference to FIG. 11. Second UE 401 may include one or more components of UE 115 and may be configured to perform similar operations as UE 115. For example, second UE 401 may include one or more of 402, 404, 406, 408, 410-416, 442, or 444.

Network entity 105 includes processor 430, memory 432, transmitter 434, receiver 436, encoder 437, decoder 438, Frame Based Operation Manager 439, Interference calculator 440, and antennas 234*a-t*. Processor 430 may be configured to execute instructions stored at memory 432 to perform the operations described herein. In some implementations, processor 430 includes or corresponds to controller/processor 240, and memory 432 includes or corresponds to memory 242. Memory 432 may be configured to store DL reference signal data 406, UL reference signal data 408, interference data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 105 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 105 described with reference to FIG. 2. Encoder 437, and decoder 438 may include the same functionality as described with reference to encoder 413 and decoder 414, respectively. Frame Based Operation Manager 439 and Interference calculator 440 may include similar functionality as described with reference to Frame Based Operation Manager 415 and Interference Calculator 416, respectively.

During operation of wireless communications system 400, network entity 105 may determine that UE 115 has receiver side frame based operation capability. For example, UE 115 may transmit a message 448, such as a capabilities message, that includes receiver side frame based operation indicator 472. Indicator 472 may indicate receiver side frame based operation capability or a particular type of receiver side frame based operation, such as by DL only, UL only, or mixed (such as UL and DL). In some implementations, network entity 105 sends control information to indicate to UE 115 that receiver side frame based operation is to be used. For example, in some implementations, message 448 (or another message, such as response or trigger message) is transmitted by the network entity 105.

In the example of FIG. 4, network entity 105 transmits an optional configuration transmission 450. The configuration transmission 450 may include or indicate a receiver side frame based operation configuration, such as settings data 444. The configuration transmission 450 (such as settings data 444 thereof) may indicate an interference threshold, a power setting, a frame type, a frame timing, etc.

For example, the configuration transmission 450 (such as settings data 444 thereof) may include frame configuration information indicating a transmission direction for each slot of one or more frames or dynamic frame configuration information indicating a transmission direction preference for each slot of a particular frame. Such information may enable increased coordination between devices and indicate when (that is what slot) to use receiver based sensing.

As another example, a second network entity (similar to network entity 105) the configuration transmission 450 (such as settings data 444 thereof) may include timing information from indicating occupied transmission time of a particular frame.

After transmission of the message 448, the configuration transmission 450 (such as a RRC message or a DCI), or both, contention procedures for a medium may begin. In the example of FIG. 4, the network entity 105 transmits a pre-grant transmission 462 during a contention period (such as contention period 310 of FIG. 3). In some implementations, the network entity 105 refrains from performing channel sensing before transmitting the pre-grant transmission 462 or transmits the pre-grant transmission independent of channel sensing. To illustrate, when using higher frequencies, directional communications, or both, channel sensing by the network entity or transmitting device may not offer much of a benefit for the power cost. Additionally, channel sensing by the network entity or transmitting device may add overhead and reduce throughput. The contention procedure may be based on (such as solely based on) a received reference signal and independent of transmitter side channel sensing. The pre-grant transmission 462 may include or correspond to a control channel transmission, such as a PDCCH, a PUCCH, or a PSCCH transmission. For example, the pre-grant transmission 462 may include or correspond to a DCI, a UCI, or a MAC-CE.

UE 115 receives the pre-grant transmission 462 and may transmit a reference signal 464 (such as a first reference signal or UL reference signal) responsive to the pre-grant transmission 462. For example, UE 115 transmits the reference signal 464 during a contention period (such as the contention period 310 of FIG. 3) when the pre-grant transmission 462 indicates or grants DL traffic or mixed traffic. As another example, the pre-grant transmission 462 includes a reference signal, such as a DMRS, and the UE 115 determines whether to transmit the reference signal 464 during a contention period (such as the contention period 310 of FIG. 3) based on the reference signal of the pre-grant transmission 462. For example, the UE 115 estimates a quality or interference of pre-grant transmission 462, such as a reference signal thereof, and the UE 115 transmits the reference signal 464 based on the quality or interference of pre-grant transmission 462 satisfying a corresponding condition. Transmitting reference signals based on a condition enables the transmitting device to know which beam or beams are viable for reception for the UE 115. Such operations may effectively filter beams that the transmitting device will select from and evaluate for downlink data transmissions.

The condition may include or correspond to one or more thresholds, such as quality or interference thresholds. The thresholds may be statically configured, semi-statically configured, or dynamically configured. For example, when statically configured the threshold may be set by a network, region, or standard. The threshold may be set upon connection to the network or prior to connection to the network, such as in configuration transmission 450. When semi-statically configured multiple thresholds may be set by a network, region, or standard and the UE may determine which value to use based on which value was most recently received or one or more other UE based determinations, such as channel quality, UE type, etc. The multiple thresholds may be received upon connection to the network or over time while the UE is connected, such as in configuration transmission 450. When dynamically configured the threshold value may indicated or included in a message which schedules or configures the data transmission. For example, each pre-grant transmission may indicate a corresponding threshold value to use.

Network entity 105 receives the reference signal 464 and may transmit a data transmission 468 (such as a first data transmission or DL data transmission) responsive to the reference signal 464. For example, the UE 115 transmits a SRS transmission, the network entity 105 estimates interference of the DL based on the SRS transmission, and the network entity 105 transmits a DL data transmission based on the determined interference of the DL. In some other implementations, the UE 115 transmits a transmission including a DMRS, such as a DMRS transmission, and the network entity 105 estimates interference of the DL based on the DMRS. In some implementations, the DL data transmission (such as data transmission 468) may be signaled or scheduled by a corresponding grant transmission. For example, the network entity 105 may transmit a PDCCH transmission, such as DCI, which signals to the DL data transmission.

Additionally, or alternatively, UE 115 may listen or monitor for a second reference signal 466 (such as a DL reference signal) responsive to the pre-grant transmission 462. For example, network entity 105 transmits the second reference signal 466 (such as CSI-RS) and the UE 115 monitors for the second reference signal 466 when the pre-grant transmission 462 indicates or grants UL traffic or mixed traffic. The second reference signal 466 (such as a DL reference signal) may enable the network entity 105 to use receiver side sensing for uplink transmissions.

In such implementations, UE 115 receives the second reference signal 466 and may transmit a second data transmission 470 (such as a UL data transmission) responsive to the second reference signal 466. For example, the network entity 105 transmits a CSI-RS transmission, the UE 115 estimates interference of the UL based on the CSI-RS transmission, and the UE 115 transmits an UL data transmission based on the determined interference of the UL. As the reference signals are defined signals, a device may compare a received reference signal with a stored version of the reference signal to estimate quality, interference or both. Additionally, or alternatively, the interference includes or correspond to beam interference. The beam interference may be generated based on transmission power and link gain, as described in detail with respect to FIG. 11.

The data transmissions 468 and 470 may be transmitted during a TXOP or a data transmission window (such as a data transmission period 312 of FIG. 3). For example, a transmitting device may transmit during the TXOP based on a contention success, such as when the transmitting device determines that the interference caused by the transmission will not adversely affect other transmission by more than a threshold amount. To illustrate, the transmitting device may compare an estimated interference value to a threshold and transmit at any time during the window when the estimated interference value is less than or equal to the threshold value. As another example, conventional scheduling operations may be used to schedule the transmissions during the TXOP. For example, a dynamic grant or PDCCH may be sent the network entity 105, and an acknowledgement or PUCCH may be sent by the UE 115 response to the dynamic grant or PDCCH.

In some implementations, the network entities 105 and 405 may exchange or communicate settings data 444. For example, the settings data 444 may include UE power class information or UE power headroom information, and one network entity may transmit such information to the other network entity. For example, the second network entity 405 may receive UE power headroom information for UE 115 from UE 115 or a database, and the second network entity 405 may transmit the UE power headroom information to the network entity 105. Accordingly, a network entity may be able to determine or estimate power adjusted interference, as described further with reference to FIG. 11.

As another example, the settings data 444 may include TDM data. To illustrate, when operating in a TDM mode, a network entity of multiple network entities may refrain from transmitting when a transmission of the network entity causes excessive DL interference (such as interference greater than a threshold) to one of the UEs, and the network entity may transmit in all other times (such as when the transmission of the network entity does not cause excessive DL interference to any of the UEs). Accordingly, as such interference information may not be determinable by the network entity, the network entity may receive such interference information, timing information of the pending transmissions, or both, from the other network entities, such as via a backhaul connection.

In some implementations where a pre-grant transmission includes a DMRS, the UE 115 will detect if a particular pre-grant transmission (such as a first pre-grant transmission) indicates that the UE 115 is being scheduled to transmit or receive data. Based on being scheduled, the UE 115 monitors for other DMRS from other gNBs, such as based on a preset parameter or a RRC configurable parameter. The other DMRS may or may not be included in pre-grant transmissions. For example, second DMRSs may be included in second pre-grant transmissions, in other physical channel transmissions, or a combination thereof. Alternatively, if the UE does not detect the particular pre-grant transmission, the UE 115 may refrain from taking other action for the frame or a portion of the frame. For example, the UE 115 may not monitor for incoming transmission, generate or transmit outgoing transmissions, or may enter a low power or sleep mode.

Figure 5:
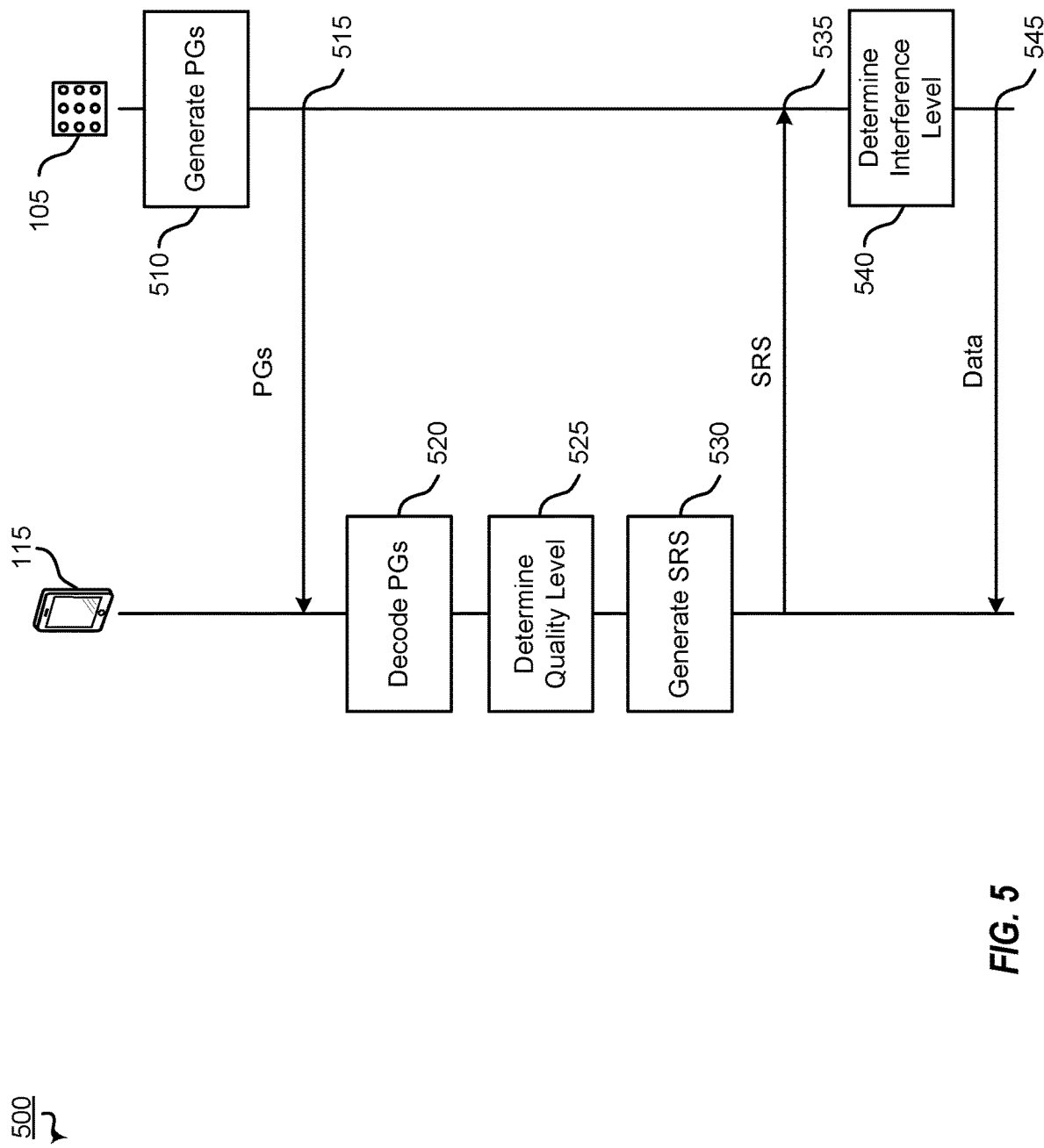
FIG. 5 is a ladder diagram illustrating an example of a process flow for a first example of frame based operation.

FIG. 5 is a ladder diagram illustrating an example of a process flow for a first example of frame based operation. Referring to FIG. 5, a process flow 500 is illustrated that supports frame based operation in accordance with aspects of the present disclosure. In some examples, process flow 500 may implement aspects of a wireless communications system 100 or 400. For example, a network entity and a UE, such as base station 105 and UE 115, may perform one or more of the processes described with reference to process flow 500. Base station 105 may communicate with UE 115 by transmitting and receiving signals through TRPs. Alternative examples of the following may be implemented, where some steps are performed in a different order than described or are not performed at all. In some cases, steps may include additional features not mentioned below, or further steps may be added.

At 510, base station 105 may generate pre-grant transmissions. The generation may include generating UE-IDs for the pre-grant transmissions. The generation also may include assigning the pre-grant transmissions to a particular beam, such as determining or selecting beam forming parameters for each pre-grant transmission.

At 515, base station 105 may transmit the generated pre-grant transmissions to UE 115. The pre-grant transmissions may be transmitted on a PDCCH from a TRP of base station 105. The pre-grant transmissions may schedule upcoming PDSCH transmissions and may include other control information. The other control information may include configuration information for PDSCH transmissions or downlink transmissions in general. In some implementations, the pre-grant transmissions include or correspond to low-code rate PDCCH transmissions. Low-code rate PDCCH transmissions may include or correspond to transmissions which have a code rate that is decodable by a UE with a lowest code rate capability (and thus the PDCCH is capable of being decoded by all UEs). Additionally, in some other implementations, base station 105 may transmit or broadcast the pre-grant transmissions to multiple UEs, as described further with reference to FIGS. 8 and 9.

UE 115 may receive the pre-grant transmissions from base station 105. At 520, UE 115 may decode the pre-grant transmissions, such as at least a portion thereof. For example, the UE 115 may decode, parse, or read the UE-ID of the pre-grant transmissions. UE 115 may identify, using the UE-ID, pre-grant transmissions intended for UE 115. Optionally, base station 105 may perform a channel sensing operation prior to transmitting to the pre-grant transmissions, such as prior to generating the pre-grant transmissions. A transmitter side channel sensing operation may further reduce interference, collisions, or both, from using received based contention operations at the cost of additional power consumption and time (such as overhead, etc.).

At 525, UE 115 may determine a quality level of the pre-grant transmission. For example, UE 115 may determine a quality metric of the pre-grant transmissions, such as SINR, RSRP, an energy metric, or a combination thereof. UE 115 may compare the quality metric to one or more thresholds to determine the quality level of the pre-grant transmissions.

The thresholds (such as values thereof) may be statically configured, semi-statically configured, or dynamically configured. For example, when statically configured the threshold value may be set by a network, region, or standard. The value may be set upon connection to the network or prior to connection to the network. When semi-statically configured multiple threshold values may be set by a network, region, or standard and the UE may determine which value to use based on which value was most recently received or based on one or more other UE based determinations, such as channel quality, UE type, etc. The multiple values may be received upon connection to the network or over time while the UE is connected, such as in RRC or DCI messages. When dynamically configured, the threshold value may indicated or included in a message which schedules or configures the data transmission. For example, each pre-grant transmission may indicate a corresponding threshold value to use.

At 530, UE 115 may generate one or more SRS transmissions based on the determined quality level. For example, when the quality metric or the quality level meets or exceeds a condition (such as a threshold), the UE 115 transmits one or more SRS transmissions. When the quality metric or the quality level fails to meet or exceed the condition (such as the threshold), the UE 115 does not transmit any SRS transmissions or refrains from transmitting SRS transmissions. At 535, UE 115 transmits the one or more generated SRS transmissions. The SRS transmissions may include a UE specific reference signal, such as a UE specific SRS. Optionally, UE 115 may perform a channel sensing operation prior to transmitting to SRS transmissions, such as prior to generating the SRS transmissions or receiving the prior to pre-grant transmissions. A transmitter side channel sensing operation may further reduce interference, collisions, or both, from using received based contention operations at the cost of additional power consumption and time (such as overhead, etc.).

At 540, base station 105 determines interference for each SRS transmission received from UE 115. For example, base station 105 determines or estimates an interference value for downlink data to UE 115 based on the interference associated with receiving each SRS transmission. To illustrate, base station 105 estimates an interference value or a power adjusted interference value, as described further with reference to FIG. 11. The interference value may include or correspond to a beam interference value. A beam interference value may be determined based on multiplying a transmission power and a link gain. Alternatively, the beam interference indicates an adjusted strength of the interference RSRP and is determined based on multiplying an adjusted transmission power and a link gain. The adjusted transmission power may be determined based on a transmission power setting and power headroom information.

At 545, base station 105 transmits downlink data (such as a data transmission or transmissions) based on the determined interference. For example, base station 105 generates or transmits downlink data based on the estimated interference level meeting or exceeding a condition. To illustrate, the base station 105 compares a power adjusted interference value to a power adjusted interference threshold. Based on the power adjusted interference value being less than or equal to the power adjusted interference threshold, the base station 105 transmits the downlink data (such as a data transmission). Alternatively, when the power adjusted interference value is greater than the power adjusted interference threshold, the base station 105 does not transmit the downlink data. In some implementation, base station 105 determines an RSRP of an interfering link and uses the RSRP to compute the estimated interference it may cause to the UE of the interfering link in a DL transmission.

The threshold value may be statically configured, semi-statically configured, or dynamically configured. For example, when statically configured the threshold value may be set by a network, region, or standard. The value may be set upon connection to the network or prior to connection to the network. When semi-statically configured multiple threshold values may be set by a network, region, or standard and the UE may determine which value to use based on which value was most recently received or based on one or more other UE based determinations, such as channel quality, UE type, etc. The multiple values may be received upon connection to the network or over time while the UE is connected, such as in RRC or DCI messages. When dynamically configured the threshold value may be indicated by or included in a message which schedules or configures the data transmission. For example, each pre-grant transmission may indicate a corresponding threshold value to use.

Figure 6:
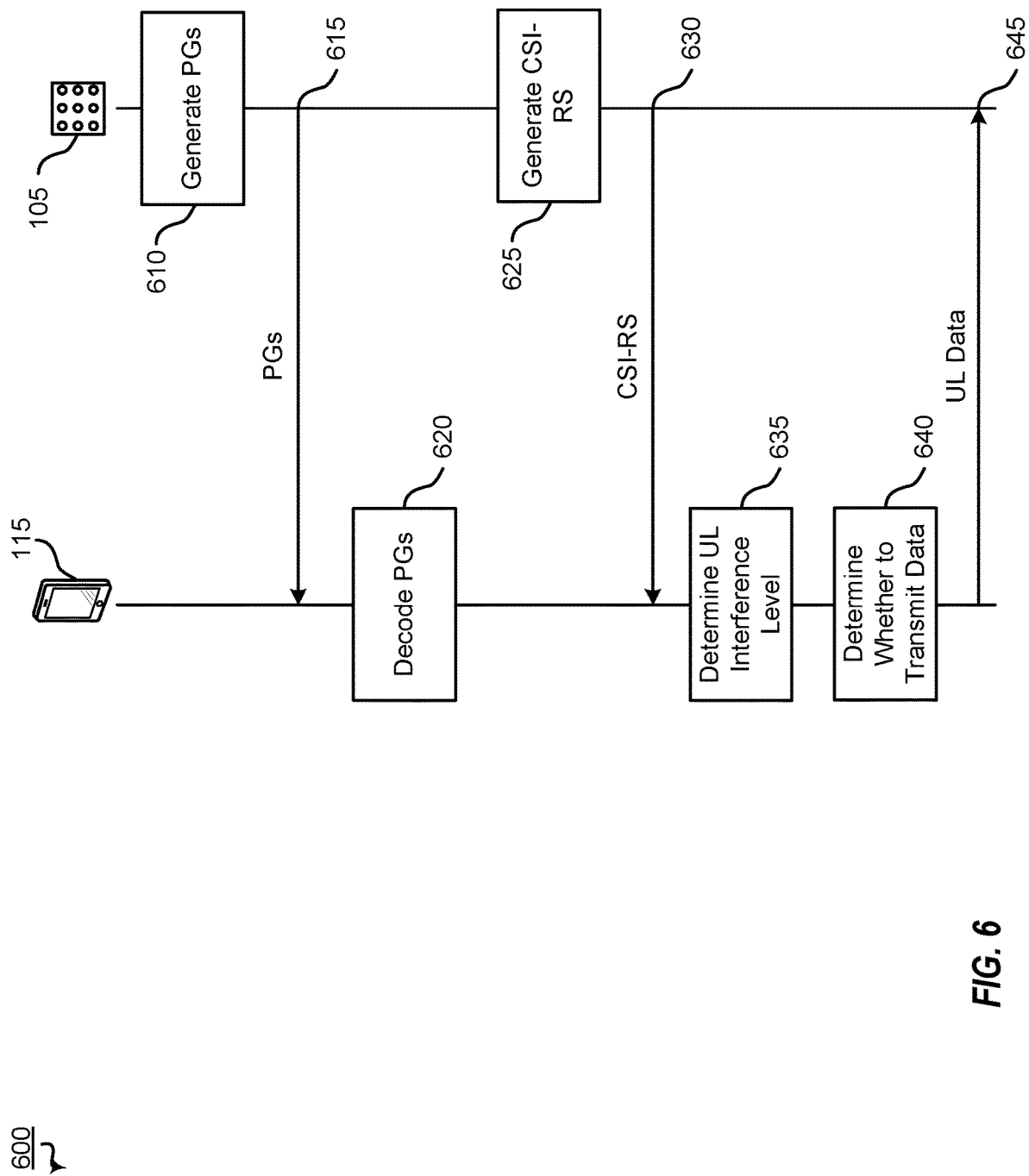
FIG. 6 is a ladder diagram illustrating an example of a process flow for a second example of frame based operation.

FIG. 6 is a ladder diagram illustrating an example of a process flow for a second example of frame based operation. Referring to FIG. 6, a process flow 600 is illustrated that supports frame based operation in accordance with aspects of the present disclosure. In some examples, process flow 600 may implement aspects of a wireless communications system 100 or 400. For example, a network entity and a UE, such as base station 105 and UE 115, may perform one or more of the processes described with reference to process flow 600. Base station 105 may communicate with UE 115 by transmitting and receiving signals through TRPs. Alternative examples of the following may be implemented, where some steps are performed in a different order than described or are not performed at all. In some cases, steps may include additional features not mentioned below, or further steps may be added.

At 610, base station 105 may generate pre-grant transmissions. The generation may include generating UE-IDs for the pre-grant transmissions. The generation also may include assigning the pre-grant transmissions to a particular beam, such as determining or selecting beam forming parameters for each pre-grant transmission.

At 615, base station 105 may transmit the generated pre-grant transmissions to UE 115, similar to as described with reference to FIG. 5. UE 115 may receive the pre-grant transmissions from base station 105. At 620, UE 115 may decode the pre-grant transmissions, such as at least a portion thereof. For example, the UE 115 may decode, parse, or read the UE-ID of the pre-grant transmissions. UE 115 may identify, using the UE-ID, pre-grant transmissions intended for UE 115.

At 625, base station 105 may generate one or more CSI-RS transmissions. For example, base station 105 may generate one or more CSI-RS transmissions based on the pre-grant transmissions. To illustrate, if three beams were used to transmit the pre-grant transmissions, then three beams may be used to transmit the CSI-RS transmissions. The CSI-RS transmissions may include or correspond to the same CSI-RS transmission or signal which is transmitted multiple times via different beams, as described further with reference to FIGS. 12A-12D. Transmitting a reference signal for each pre-grant enables the network to indicate to the UE how many reference signals will be transmitted or how many beams the base station 105 will use to transmit the reference signals, and to indicate how many times the UE should attempt to receive the reference signals.

In some implementations, the one or more CSI-RS transmissions may be generated based on quality metrics. For example, base station 105 may determine a quality metric associated with the pre-grant transmissions or the link, such as SINR, RSRP, an energy metric, or both. Base station 105 may compare the quality metric to one or more thresholds to determine the quality level of the link between base station 105 and UE 115. When the quality metric or the quality level meets or exceeds a condition (such as a threshold), the base station 105 generates or transmits the one or more CSI-RS transmissions. When the quality metric or the quality level fails to meet or exceed the condition (such as a threshold), the base station 105 does not generate or transmit any CSI-RS transmissions or refrains from transmitting CSI-RS transmissions. The thresholds may be statically configured, semi-statically configured, or dynamically configured as described above and with reference to FIGS. 4 and 5. At 630, base station 105 transmits the one or more generated CSI-RS transmissions.

At 635, UE 115 determines interference for each CSI-RS transmission received from base station 105. For example, UE 115 determines or estimates an interference value for uplink data to base station 105 based on the interference associated with receiving each CSI-RS transmission. To illustrate, UE 115 estimates an interference value or a power adjusted interference value, as described further with reference to FIG. 11.

The interference value may include or correspond to a beam interference value. A beam interference value may be determined based on multiplying a transmission power and a link gain. Alternatively, the beam interference indicates an adjusted strength of the interference RSRP and is determined based on multiplying an adjusted transmission power and the link gain. The adjusted transmission power may be determined based on a transmission power setting and power headroom information.

At 640, UE 115 determines whether to transmit uplink data (such as a data transmission or transmissions) based on the determined interference. For example, UE 115 generates or transmits uplink data based on the estimated interference level meeting or exceeding a condition. To illustrate, UE 115 compares a power adjusted interference value to a power adjusted interference threshold. Based on the power adjusted interference value being less than or equal to the power adjusted interference threshold, UE 115 determines to generate data, transmit data, or both. Alternatively, when the power adjusted interference value is greater than the power adjusted interference threshold, UE 115 determines to not generate data, transmit data, or both. At 645, UE 115 transmits the uplink data (such as a data transmission) based on the determination.

Figure 7:
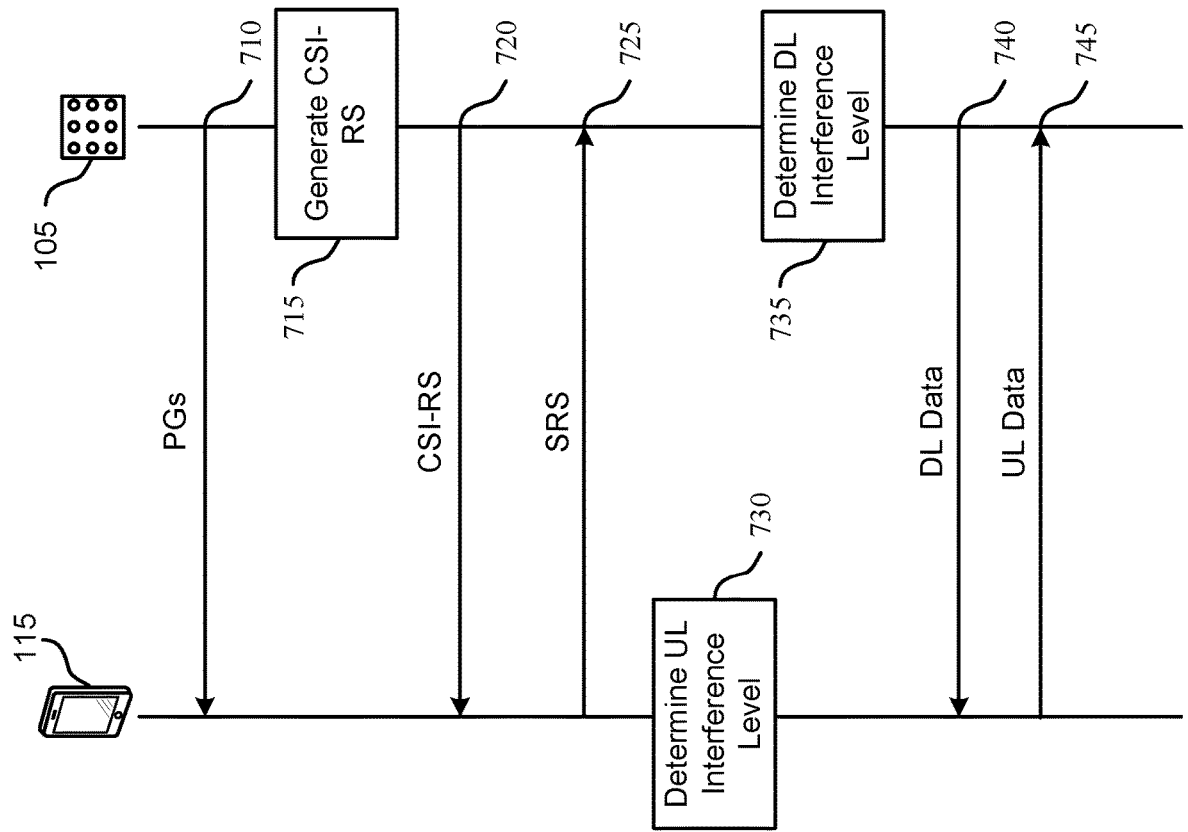
FIG. 7 is a ladder diagram illustrating an example of a process flow for a third example of frame based operation.

FIG. 7 is a ladder diagram illustrating an example of a process flow for a third example of frame based operation. Referring to FIG. 7, a process flow 700 is illustrated that supports frame based operation in accordance with aspects of the present disclosure. In some examples, process flow 700 may implement aspects of a wireless communications system 100 or 400. For example, a network entity and a UE, such as base station 105 and UE 115, may perform one or more of the processes described with reference to process flow 700. Base station 105 may communicate with UE 115 by transmitting and receiving signals through TRPs. Alternative examples of the following may be implemented, where some steps are performed in a different order than described or are not performed at all. In some cases, steps may include additional features not mentioned below, or further steps may be added.

At 710, base station 105 may transmit pre-grant transmissions to UE 115. The pre-grant transmissions may include UE-IDs in some implementations. The pre-grant transmissions may be assigned to a particular beam, such as by determining or selecting beam forming parameters for each pre-grant transmission. The pre-grant transmissions sent on different beams may have the same or different content. For example, a first pre-grant transmission may indicate UL traffic, a second pre-grant transmission may indicate DL traffic, and a third pre-grant transmission may indicate mixed traffic. Additionally, or alternatively, the pre-grant transmissions sent on different beams may be addressed to different UEs, such as by including different UE-IDs. At 715, base station 105 may generate one or more CSI-RS transmissions, such as described with reference to FIG. 6. At 720, base station 105 transmits the one or more generated CSI-RS transmissions.

At 725, UE 115 transmits one or more SRS transmissions to base station 105. In some implementations, UE 115 generates or transmits the one or more SRS transmissions based on a quality level of the link, the one or more pre-grant transmissions, or both, as described with reference to FIG. 5. The SRS transmissions may include a UE specific SRS. Although the base station 105 transmits the CSI-RS transmissions before the UE 115 transmits the SRS transmissions in the example of FIG. 7, in some other implementations the base station 105 transmits the CSI-RS transmissions after the UE 115 transmits the SRS transmissions.

At 730, UE 115 determines interference for each CSI-RS transmission received from base station 105. For example, UE 115 determines or estimates an interference value for uplink data to base station 105. To illustrate, UE 115 estimates an interference value or a power adjusted interference value.

At 735, base station 105 determines interference for each SRS transmission received from UE 115. For example, base station 105 determines or estimates an interference value for downlink data to UE 115. To illustrate, base station 105 estimates an interference value or a power adjusted interference value. Although the base station 105 determines the downlink interference after the UE 115 determines the uplink interference in the example of FIG. 7, in some other implementations the devices may determine the interference concurrently or the base station 105 may determine the downlink interference before the UE 115 determines the uplink interference.

At 740, base station 105 transmits the downlink data (such as a first data transmission) based on the determined downlink interference. At 745, UE 115 transmits the uplink data (such as a second data transmission) based on the determined uplink interference. Although the base station 105 transmits the downlink transmissions before the UE 115 transmits the uplink transmissions in the example of FIG. 7, in some other implementations the base station 105 transmits the downlinks transmissions after the UE 115 transmits the uplink transmissions. Accordingly, a base station and a UE may operate a downlink only mode as in FIG. 5, an uplink only mode as in FIG. 6, or a mixed mode as in FIG. 7. Although one base station and one UE are illustrated in the examples of FIGS. 5-7, in some other implementations, the network includes multiple base station, UEs, or both, such as described with reference to FIGS. 8 and 9.

Figure 8:
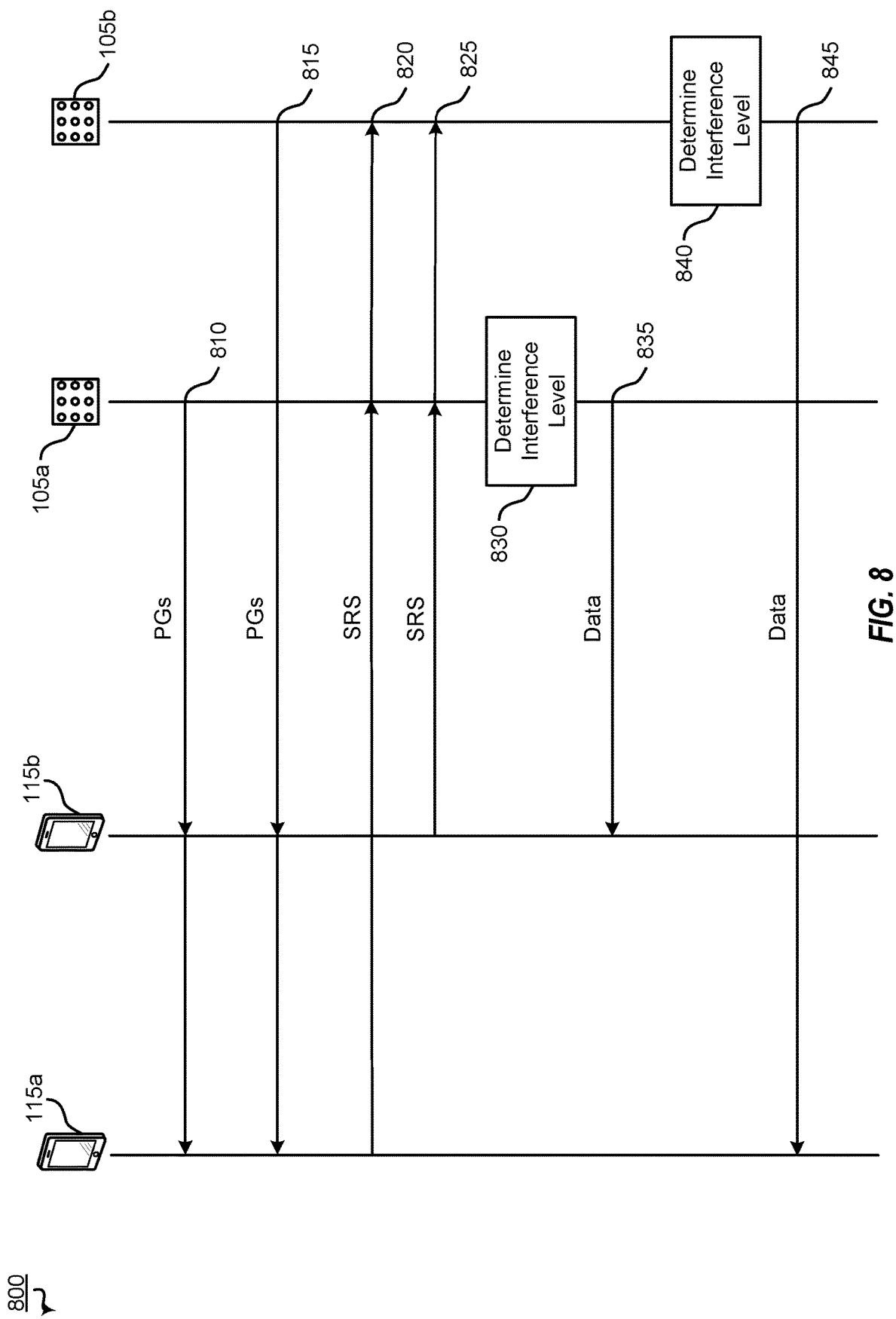
FIG. 8 is a ladder diagram illustrating an example of a process flow for a fourth example of frame based operation.

FIG. 8 is a ladder diagram illustrating an example of a process flow for a fourth example of frame based operation. Referring to FIG. 8, a process flow 800 is illustrated that supports frame based operation in accordance with aspects of the present disclosure. In some examples, process flow 800 may implement aspects of a wireless communications system 100 or 400. For example, network entities and UEs, such as base stations 105*a* and 105*b* and UEs 115*a* and 115*b*, may perform one or more of the processes described with reference to process flow 800. Base stations 105*a* and 105*b* may communicate with UEs 115*a* and 115*b* by transmitting and receiving signals through corresponding TRPs. In other cases, 105*a* and 105*b* may correspond to different TRPs of the same network entity (such as the same base station). Alternative examples of the following may be implemented, where some steps are performed in a different order than described or are not performed at all. In some cases, steps may include additional features not mentioned below, or further steps may be added.

At 810, first base station 105*a* transmits first pre-grant transmissions to first UE 115*a* and second UE 115*b*. For example, the first pre-grant transmissions may be broadcast to multiple devices. The first pre-grant transmissions may include UE-IDs in some implementations. The UE-IDs may indicate a particular UE or group of UEs. As described with reference to FIG. 5, the first pre-grant transmissions may be transmitted via PDCCHs. At 815, second base station 105*b* transmits second pre-grant transmissions to first UE 115*a* and second UE 115*b*, similar to the first pre-grant transmissions sent by the first base station 105*a* at 810.

The UEs 115*a* and 115*b* may receive the pre-grant transmissions from the base stations 105*a* and 105*b*. At 820, first UE 115*a* transmits one or more first SRS transmissions to the first base station 105*a* and the second base station 105*b*. At 825, second UE 115*b* transmits one or more second SRS transmissions to the first base station 105*a* and the second base station 105*b*. As described with reference to FIG. 5, the SRS transmissions may include a UE specific reference signal, such as a UE specific SRS, and the SRS transmissions may be generated and transmitted based on a quality level of the pre-grant transmissions received by the UEs 115*a* and 115*b*.

At 830, first base station 105*a* determines interference for each SRS transmission received from the UEs 115*a* and 115*b*. For example, first base station 105*a* determines or estimates an interference value for first downlink data to UEs 115*a* and 115*b*, as described with reference to FIG. 5. In some implementations, the base stations 105*a* and 105*b* estimate the interference they will cause to each UE in the DL or reverse direction based on the received SRS on each beam. To illustrate, each base station may estimate the interference they will cause to each UE in the DL or reverse direction by determining a beam interference for the received SRS on each beam. Additionally, a base station can adjust the interference level based on the UE's intended transmit power.

At 835, first base station 105*a* transmits the first downlink data (such as a data transmission or transmissions) based on the determined interference. For example, first base station 105*a* generates or transmits the first downlink data to the second UE 115*b* based on a first estimated interference level meeting or exceeding a condition, as described with reference to FIG. 5. First base station 105*a* may not generate or transmit the first downlink data to the first UE 115*a* based on a second estimated interference level failing to meet or exceed the condition.

At 840, second base station 105*b* determines interference for each SRS transmission received from the UEs 115*a* and 115*b*. For example, second base station 105*b* determines or estimates an interference value for second downlink data to UEs 115*a* and 115*b*, as described with reference to FIG. 5.

At 845, second base station 105*b* transmits the second downlink data (such as a data transmission) based on the determined interference. For example, second base station 105*b* generates or transmits the second downlink data to the first UE 115*a* based on a first estimated interference level meeting or exceeding a condition, as described with reference to FIG. 5. Second base station 105*b* may not generate or transmit the second downlink data to the second UE 115*b* based on a second estimated interference level failing to meet or exceed the condition. Although the first base station 105*a* determines interference and transmits the first downlink data before the second base station 105*b* determines interference and transmits the second downlink data in the example of FIG. 7, in some other implementations the first base station 105*a* may determine interference, transmit the first downlink data, or both, after the second base station 105*b* determines interference, transmits the second downlink data, or both.

Additionally, the first base station 105*a* and the second base station 105*b* may each transmit downlink data at least partially concurrently with each other, such as in the same slot or TXOP. This may enable both devices to "win" the medium as each base station is determining to send the downlink data based on receiver side/based interference estimates as opposed to energy sensing on the transmitter side.

Figure 9:
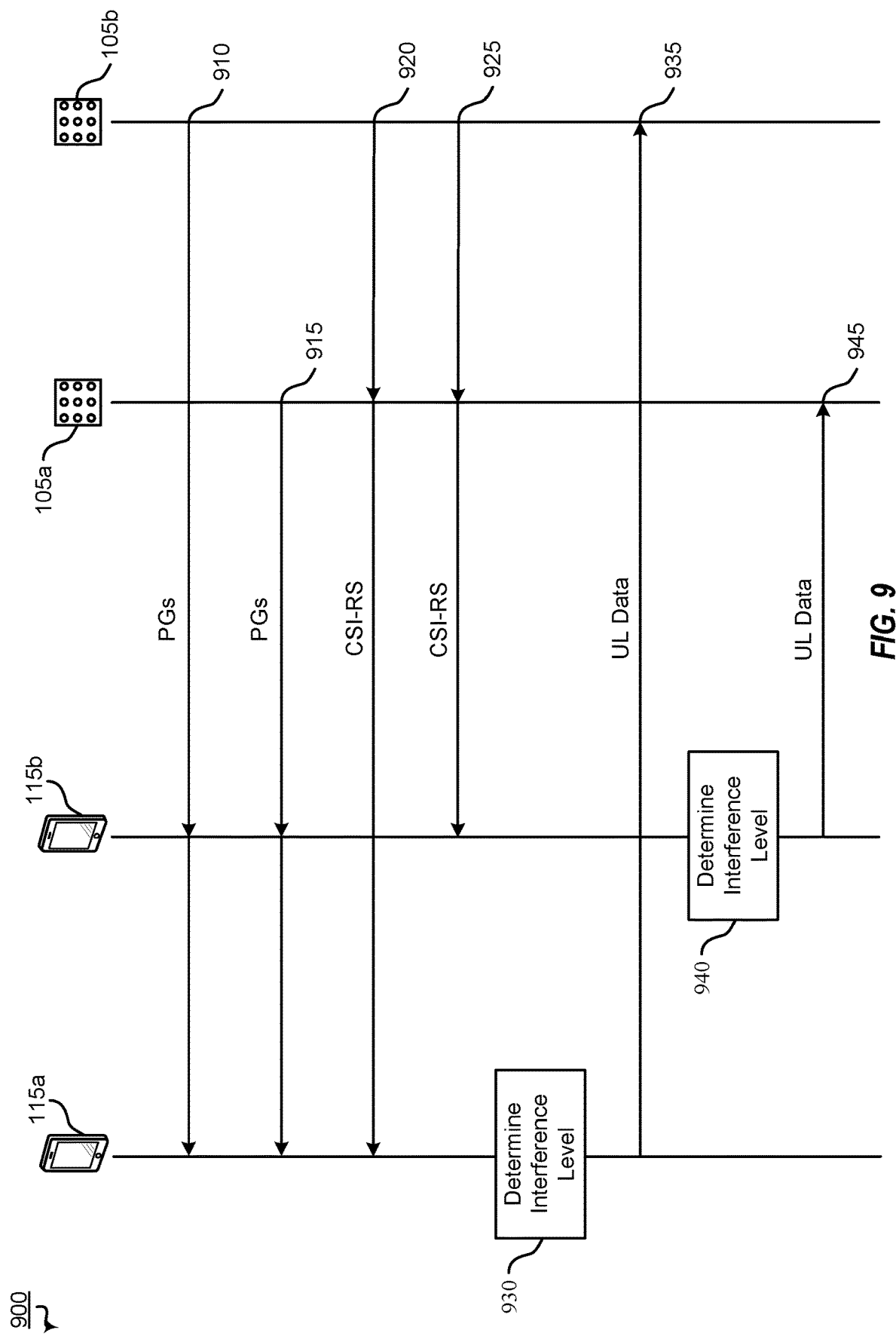
FIG. 9 is a ladder diagram illustrating an example of a process flow for a fifth example of frame based operation.

FIG. 9 is a ladder diagram illustrating an example of a process flow for a fifth example of frame based operation. Referring to FIG. 9, a process flow 900 is illustrated that supports frame based operation in accordance with aspects of the present disclosure. In some examples, process flow 900 may implement aspects of a wireless communications system 100 or 400. For example, network entities and UEs, such as base stations 105*a* and 105*b* and UEs 115*a* and 115*b*, may perform one or more of the processes described with reference to process flow 900. Base stations 105*a* and 105*b* may communicate with UEs 115*a* and 115*b* by transmitting and receiving signals through corresponding TRPs. In other cases, 105*a* and 105*b* may correspond to different TRPs of the same network entity (such as the same base station). Alternative examples of the following may be implemented, where some steps are performed in a different order than described or are not performed at all. In some cases, steps may include additional features not mentioned below, or further steps may be added.

At 910, first base station 105*a* transmits first pre-grant transmissions to first UE 115*a* and second UE 115*b*. At 915, second base station 105*b* transmits second pre-grant transmissions to first UE 115*a* and second UE 115*b*. As described with reference to FIG. 5, the first and second pre-grant transmissions may be transmitted via PDCCHs.

At 920, first base station 105*a* transmits one or more first CSI-RS transmissions to the first UE 115*a* and the second UE 115*b*. At 925, second UE base station 105*b* transmits one or more second CSI-RS transmissions to the first UE 115*a* and the second UE 115*b*, as described with reference to FIG. 6.

At 930, first UE 115*a* determines interference for each CSI-RS transmission received from the base stations 105*a* and 105*b*. For example, first UE 115*a* determines or estimates an interference value for first uplink data to base stations 105*a* and 105*b*, as described with reference to FIG. 6. In some implementations, the UEs 115*a* and 115*b* estimate the interference they will cause to each network entity (such as a gNB receiver) in the UL or reverse direction based on the received CSI-RS on each beam. Additionally, when a network entity transmits at full power, a UE can adjust the interference level based on its intended transmit power.

At 935, first UE 115*a* transmits the first uplink data (such as a data transmission) based on the determined interference. For example, first UE 115*a* generates or transmits the first uplink data to the second base station 105*b* based on a first estimated interference level meeting or exceeding a condition, as described with reference to FIG. 6. First UE 115*a* may not generate or transmit the first downlink data to the first base station 105*a* based on a second estimated interference level failing to meet or exceed the condition.

At 940, second UE 115*b* determines interference for each SRS transmission received from the UEs 115*a* and 115*b*. For example, second base station 105*b* determines or estimates an interference value for second uplink data to UEs 115*a* and 115*b*, as described with reference to FIG. 6.

At 945, second UE 115*b* transmits the second uplink data (such as a data transmission) based on the determined interference. For example, second UE 115*b* generates or transmits the second uplink data to the first base station 105*a* based on a first estimated interference level meeting or exceeding a condition, as described with reference to FIG. 6. Second UE 115*b* may not generate or transmit the first downlink data to the second base station 105*b* based on a second estimated interference level failing to meet or exceed the condition. Although the first UE 115*a* determines interference and transmits the first uplink data before the second UE 115*b* determines interference and transmits the second uplink data in the example of FIG. 7, in some other implementations the first UE 115*a* may determine interference, transmit the first uplink data, or both, after the second UE 115*b* determines interference, transmits the second uplink data, or both.

Additionally, the first UE 115*a* and the second UE 115*b* may each transmit downlink data at least partially concurrently with each other, such as in the same slot or TXOP. This may enable both devices to "win" the medium as each base station is determining to send the downlink data based on receiver side/based interference estimates as opposed to energy sensing on the transmitter side.

Accordingly, multiple base stations and UEs may operate a downlink only mode as in FIG. 8, an uplink only mode as in FIG. 9, or a mixed mode (similar to FIG. 7). Although one base station and one UE are illustrated in the examples of FIGS. 5-7, in some other implementations, the network includes multiple base stations, UEs, or both, such as described with reference to FIGS. 8 and 9. The operations described in any of FIGS. 5-9 may be combined or substituted for any one or more operations of the other of FIGS. 5-9. For example, mixed mode operations as in FIG. 7 may occur with more than one UE, more than one base station, or both, as in either of FIG. 8 or 9.

FIGS. 10A-10D are diagrams illustrating an example of downlink frame based operation. FIGS. 10A and 10B illustrate timing diagrams of a contention period in a frame, such as contention period 310 of FIG. 3 and a contention period as described with reference to FIG. 4. FIG. 10A illustrates a first timing diagram of a particular contention period 1010 for a first base station 105a, and FIG. 10B illustrates a second timing diagram of the particular contention period 1010 for a second base station 105b. Each timing diagram depicts eight time periods (such as slots or windows) of the particular contention period.

Referring to FIG. 10A, the first timing diagram depicts transmissions during the eight time periods of the particular contention period 1010 for a first base station 105a (such as a first gNB). As illustrated in FIG. 10A, the contention period 1010 includes a pre-grant transmission period 1020, a reference signal transmission period 1030, and one or more gaps 1040. The pre-grant transmission period 1020 corresponds to a period of time (such as a first or beginning portion) of the contention period 1010 where pre-grant transmissions are transmitted by network entities. The reference signal transmission period 1030 corresponds to a period of time (such as middle or end portion) of the contention period 1010 where reference signal transmissions are transmitted by UEs, network entities, or both. The one or more gaps 1040 may corresponds to one or more periods of time of the contention period 1010 where no transmissions are transmitted by UEs, network entities, or both. For example, the contention period 1010 may include a first gap between the pre-grant transmission period 1020 and the reference signal transmission period 1030, a second gap after the reference signal transmission period 1030, or both. In some implementations, the one or more gaps 1040 may include or correspond to a processing gap. For example, one or more device of the network may utilize such time to process received transmission, determine whether to monitor for new incoming transmissions, determine whether to generate new outgoing transmissions, generate new outgoing transmissions, or a combination thereof. Alternatively, in some other implementations, the contention period 1010 may not include a gap.

Referring to FIG. 10B, the second timing diagram depicts transmissions during the eight time periods of the particular contention period 1010 for a second base station 105b (such as a second gNB). As illustrated in FIG. 10B, the contention period 1010 includes the pre-grant transmission period 1020, the reference signal transmission period 1030, the one or more gaps 1040, and unused portions 1050. The unused portions 1050 may correspond to one or more periods of time of the contention period 1010 where no transmissions are transmitted, received, or both, by the particular device, such as second base station 105b. For example, the unused portions 1050 may include a first unused portion for the second base station 105b between the pre-grant transmission period 1020 and the first gap, a second unused portion for the second base station 105b between the reference signal transmission period 1030 and the second gap. During the unused portions 1050, the second base station 105b does not transmit or receive data. Other devices, such as first base station 105a, UEs, or both, may transmit or receive data during the unused portions 1050.

FIGS. 10C and 10D illustrate beam diagrams for the particular contention period illustrated in FIGS. 10A and 10B. FIG. 10C illustrates a first beam diagram depicting beams for pre-grant transmissions of the pre-grant transmission period 1020, and FIG. 10D illustrates a second beam diagram depicting beams for SRS transmissions of the reference signal transmission period 1030.

Referring to FIG. 10C, the first beam diagram depicts pre-grant transmissions for the first and second base stations 105a and 105b. Each base station transmits pre-grant transmissions to the UEs. For example, a base station may transmit a particular pre-grant transmission for each beam of plurality of beams that the base station has or plans on using for the particular frame. Transmitting a pre-grant for each beam enables the network to indicate to the UE how many beams the base station will use to receive the reference signal and how many times the UE should transmit the reference signal. In the example of FIG. 10C, first base station 105a transmits a first pre-grant transmission (such as gNB PG1) on B1, a second pre-grant transmission on B2, and a third pre-grant transmission on B3. Second base station 105b transmits a first pre-grant transmission (such as gNB PG1 or a fourth pre-grant transmission) on B4 and a second pre-grant transmission (such as gNB PG2 or a fifth pre-grant transmission) on B5.

Referring to FIG. 10D, the second beam diagram depicts SRS transmissions for the UEs 115a-f. Each UE may transmit UE specific SRS transmissions to the base stations. In some implementations, the SRS transmissions may be sent based on a quality level or quality indications associated with the pre-grant transmissions. In the example illustrated in FIG. 10D, each UE transmits a corresponding SRS signal. For example, first UE 115a transmits a first SRS signal, SRS1. Each UE may transmit their specific SRS signal during each window or slot of the reference signal transmission period 1030 in some implementations. For example, the first UE 115a transmits the first SRS signal, SRS1, three times during the reference signal transmission period 1030, such as one time in each window or slot thereof. During each slot, the base stations 105a and 105b may attempt to receive the data using different beams. For example, the first base station 105a attempts to receive each SRS transmission from the first UE 115a using a different beam, such as beams B1, B2, and B3. Using multiple beams enables the base stations to accurately determine interference from a particular direction and for a particular UE. Thus, if the determined interference for multiple directions/UEs is acceptable or satisfies a condition, then multiple transmission may occur at one time which increase throughput. In the example of FIG. 10D, the base stations 105a and 105b may each transmit downlink data to at least one UE. However, with conventional transmitter side contention operations one of the base stations may refrain from transmitting in a particular slot or TXOP when the base station detects that the other base station is already transmitting. In some implementations, the first base station 105a attempts to receive SRS transmissions from each of the UEs 115a-f when monitoring for transmissions with a particular beam.

FIG. 11 is a block diagram illustrating an example of beam interference. Referring to FIG. 11, a block diagram 1100 depicting links between two network entities and two UEs is illustrated. As illustrated in FIG. 11, each device has two links, each link has an associated interference. In some circumstances, uplink interference for a particular link may be different than downlink interference for the particular link. Accordingly, a device or devices of the link may calculate uplink interference and downlink interference separately. Alternatively, a device or devices of the link may calculate one-way interference (such as uplink or downlink) and use that interference value for the opposite direction or use that interference value to estimate the other interference value for the opposite direction. The interference value may be determined based on transmission power and link gain.

In some implementations, generating the beam interference value includes multiplying a transmission power and a link gain to estimate the beam interference value. For example, a transmit power ($P_{ue,2}$) of the second UE is multiplied by an absolute value of the corresponding link gain ($H_{21}$) between the second UE and the first network entity squared, that is $P_{ue,2}*|H_{21}|^2$.

In some other implementations, generating the beam interference value includes determining an adjusted transmission power based on a transmission power setting and power headroom information, and multiplying the adjusted transmission power and a link gain to estimate the beam interference value, where the beam interference value is an adjusted strength of the interference RSRP. For example, an adjusted transmit power of the second UE (UE2) may be determined based on a transmission power setting (such as UE power class information) and a power headroom value (such as power back off value). The adjusted transmit power may be multiplied by a link gain of a link of the second UE to determine or estimate the corresponding link interference for the uplink. To illustrate, an adjusted transmit power ($P'_{ue,2}$) of the second UE is multiplied by an absolute value of the corresponding link gain ($H_{21}$) between the second UE and the first network entity squared, that is $P'_{ue,2}*|H^{21}|^2$.

Figure 12D:
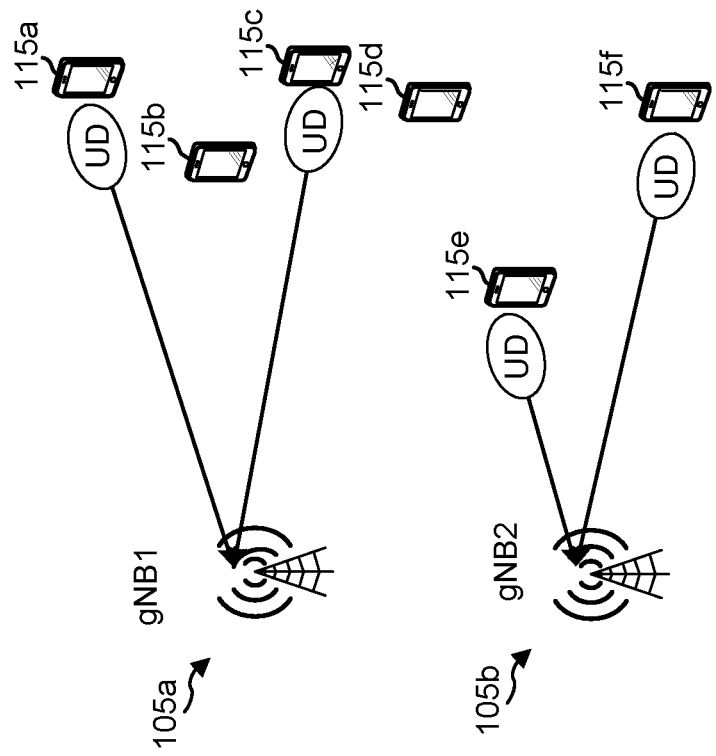

FIGS. 12A-12D are diagrams illustrating an example of uplink frame based operation. FIGS. 12A and 12B illustrate timing diagrams of a contention period in a frame, such as contention period 310 of FIG. 3 and a contention period as described with reference to FIG. 4. FIG. 12A illustrates a first timing diagram of a particular contention period 1210 for a first base station 105a, and FIG. 12B illustrates a second timing diagram of the particular contention period 1210 for a second base station 105b.

Referring to FIG. 12A, the first timing diagram depicts transmissions of the particular contention period 1210 for a first base station 105a (such as a first gNB). As illustrated in FIG. 12A, the contention period 1210 includes a pre-grant transmission period 1220, a reference signal transmission period 1230, and one or more gaps 1240. The pre-grant transmission period 1220 may include or correspond to the pre-grant transmission period 1020 of FIGS. 10A and 10B. The reference signal transmission period 1230 may include or correspond to the reference signal transmission period 1030 of FIGS. 10A and 10B. The one or more gaps 1240 may include or correspond to the one or more gaps 1040 of FIGS. 10A and 10B. Alternatively, in some other implementations, the contention period 1210 may not include a gap.

Referring to FIG. 12B, the second timing diagram depicts transmissions of the particular contention period 1210 for a second base station 105b (such as a second gNB). As illustrated in FIG. 12B, the contention period 1210 includes the pre-grant transmission period 1220, the reference signal transmission period 1230, one or more gaps 1240, and unused portions 1250. The unused portions 1050 may include or correspond to the unused portions 1050 of FIG. 10B.

Figure 12C:
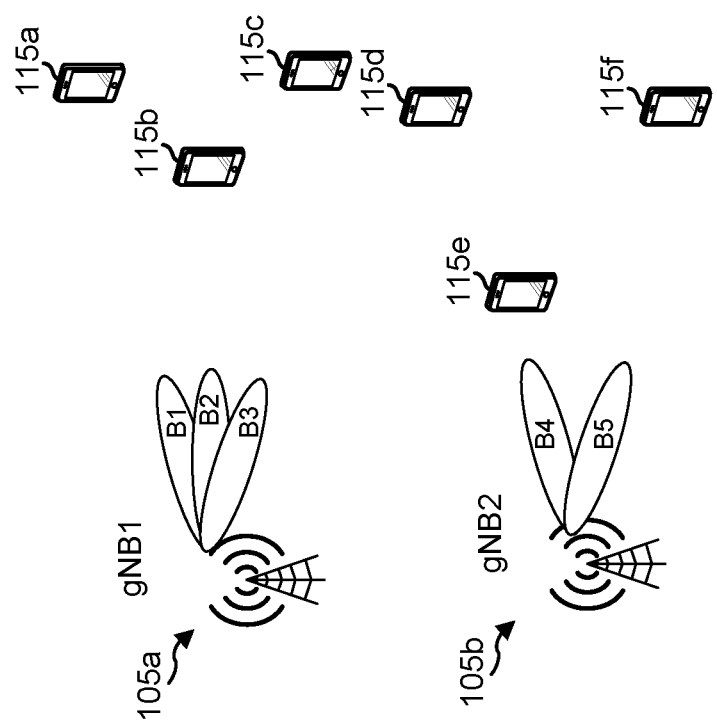

FIGS. 12C and 12D illustrate beam diagrams for the particular contention period illustrated in FIGS. 12A and 12B. FIG. 12C illustrates a first beam diagram depicting beams for CSI-RS transmissions, and FIG. 12D illustrates a second beam diagram depicting beams for data transmissions (such as uplink data).

Referring to FIG. 12C, the first beam diagram depicts CSI-RS transmissions for the first and second base stations 105a and 105b. Each base station 105a and 105b transmits CSI-RS transmissions to the UEs 115a-f. For example, a base station may sweep a particular CSI-RS on all beams that the base station has or plans on using for the particular frame. To illustrate, first base station 105a transmits CSI-RS1 three times sequentially on beams B1, B2, and B3, and second base station 105b transmits CSI-RS2 two times, first on beam B1 and then on beam B2. In some other implementations, the beams may be swept in a different or random order. In some implementations, the UEs may monitor a subset of beams of available UE beams. For example, a UE may only monitor a selected beam that it has determined to use for transmission.

Referring to FIG. 12D, the second beam diagram depicts uplink data transmissions for the UEs 115a-f. Each UE may transmit uplink data to the base stations 105a and 105b based on the determined interference. In the example illustrated in FIG. 12D, the first UE 115a and the third UE 115c transmit uplink data to the first base station 105a, and the fifth UE 115e and the sixth UE 115f transmit uplink data to the second base station 105b. The uplink data transmissions may occur during a transmit window or portion of the frame, such as a TXOP (such as a data transmission period 312 of FIG. 3).

Figure 17:
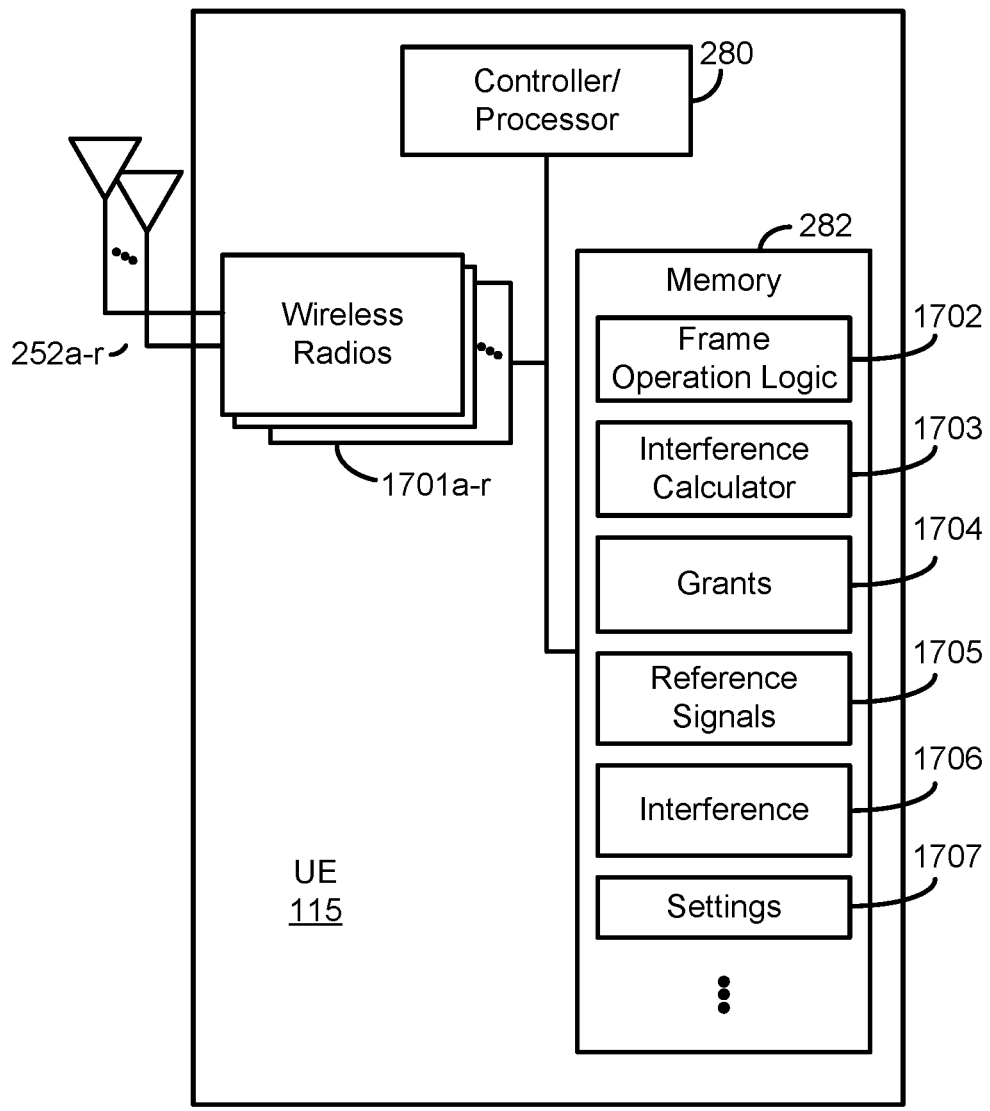
FIG. 17 is a block diagram conceptually illustrating an example design of a UE.

FIG. 13 is a flowchart illustrating example blocks executed by a UE. The example blocks will also be described with respect to the UE 115 as illustrated in FIG. 17. FIG. 17 is a block diagram conceptually illustrating an example design of a UE. FIG. 17 illustrates a UE 115 configured according to one aspect of the present disclosure. The UE 115 includes the structure, hardware, and components as illustrated for the UE 115 of FIG. 2 or 4. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via the wireless radios 1701a-r and the antennas 252a-r. The wireless radios 1701a-r includes various components and hardware, as illustrated in FIG. 2 for the UE 115, including the modulator/demodulators 254a-r, the MIMO detector 256, the receive processor 258, the transmit processor 264, and the TX MIMO processor 266.

As shown, the memory 282 may include Frame Operation Logic 1702, Interference Logic 1703, grant data 1704, reference signal data 1705, interference data 1706, and settings data 1707. The grant data 1704, the reference signal data 1705, and the settings data 1707 may include or correspond to DL reference signal data 406, UL reference signal data 408, interference data 442, and settings data 444. The Frame Operation Logic 1702 may include or correspond to the Frame Based Operation Manager 415. The Interference Logic 1703 may include or correspond to the Interference Calculator 416. In some aspects, the logic 1702 and 1703, may include or correspond to processor(s) 280. The UE 115 may receive signals from or transmit signals to a base station or base stations, such as the base station 105 or the network entity or entities 105, 405. When communicating with a single base station or serving cell, the UE 115 may receive signals from or transmit signals to multiple TRPs of the single base station or serving cell.

Referring to FIG. 13, at block 1300, the UE 115 receives one or more pre-grant transmissions, where each pre-grant transmission is associated with a beam of a plurality of beams and the plurality of beams are in a millimeter wave frequency range. For example, one pre-grant transmission is received on each beam of the plurality of beams. In some implementations, the one or more pre-grant transmissions include a reference signal, such as a DMRS.

At block 1301, the UE 115 decodes the one or more pre-grant transmissions. In some implementations, the one or more pre-grant transmissions include corresponding UE-IDs. The UE-ID may indicate or identify a particular UE for which a grant of the pre-grant transmission is intended. To illustrate, a UE may parse or decode the UE-ID of a pre-grant transmission to determine if the UE needs to decode or process the pre-grant transmission further.

At block 1302, the UE 115 determines whether the one or more decoded pre-grant transmissions satisfy one or more quality conditions. In some implementations, the UE 115 determines a quality level of the pre-grant transmissions, such as by using a reference signal thereof. For example, the UE 115 may determine to decode or process the one or more pre-grant transmissions based on the quality level of the pre-grant transmissions. The quality level may include a received power or quality metric. Determining to decode or further process the pre-grant transmissions based on the quality level of the pre-grant transmissions may result in power savings over attempting to decode and process each pre-grant transmission no matter its quality.

At block 1303, the UE 115 transmits one or more reference signals based on determining that the one or more decoded pre-grant transmissions satisfy the one or more quality conditions. For example, the UE 115 compares a quality level of the pre-grant transmissions to a RSRP or SINR threshold. The threshold value may be statically configured, semi-statically configured, or dynamically configured as described above and with reference to FIGS. 4 and 5. In some implementations, the one or more reference signals include or correspond to uplink reference signal transmissions, such as SRS transmissions or DMRS transmissions.

At block 1304, the UE 115 optionally receives one or more grant transmissions responsive to the one or more reference signals. For example, the UE 115 may receive one or more grant transmissions based on the reference signal transmissions satisfying network conditions. In some implementations, the one or more grant transmissions signal one or more data transmissions, such as indicate or identify resources for the one or more data transmissions.

At block 1305, the UE 115 optionally receives a data transmission based on the one or more grant transmissions. For example, the UE 115 determines a resource or resources for the data transmission (or transmissions) based on the one or more grant transmissions, and the UE 115 monitors the resource or resources to receive the data transmission (or transmissions). In some implementations, the data transmission may not be sent, that is when the network determines that interference associated with the reference signal transmissions exceeded an interference or quality threshold.

In some implementations, the UE 115 may execute one or more additional blocks, such as to perform one or more other operations described herein. For example, the UE 115 may receive multiple data transmissions responsive to the one or more reference signals. For example, the UE may receive a first data transmission from a first network entity and a second data transmission from a second network entity. As another example, the UE may receive a plurality of first data transmissions from a first network entity and a plurality of second data transmissions from a second network entity.

In some implementations, the UE can operate in millimeter wave frequency ranges and in licensed, unlicensed, or shared spectrum. Additionally, or alternatively, the UE can operate in a framed based operation mode and frames of the UE may be time aligned with corresponding frames of one or more network entities and the frames may have a fixed duration for the one or more network entities.

In some implementations, the one or more reference signals include one or more reference signal transmissions, such as SRS transmissions. Additionally, or alternatively, the one or more quality conditions include a signal-to-noise ratio (SINR), a received signal reference power (RSRP), an energy metric, or a combination thereof.

In some implementations, the one or more pre-grant transmissions may include a DMRS. The DMRS may be used to determine whether further actions should be performed by the UE 115.

In some implementations, the UE 115 may transmit information to a network entity indicating a power transmission mode or information associated with the power transmission mode. For example, when the UE is operating in a full power transmission mode (such as when transmitting with no power back-off or headroom), the UE 115 transmits power class information, nominal transmit power information, or both for the UE. As another example, when the UE is operating in a power control mode (such as with a power back-off or headroom), the UE 115 transmits power headroom information, such as current power headroom information or a preset or default power headroom information. Additionally, the power headroom information may be transmitted via an uplink control channel or an uplink data channel.

In some implementations, the UE 115 determines the power headroom information, such as current power headroom information. For example, the UE 115 calculates the power headroom information based on a power usage of a current band and independent of a power usage on other bands.

Figure 18:
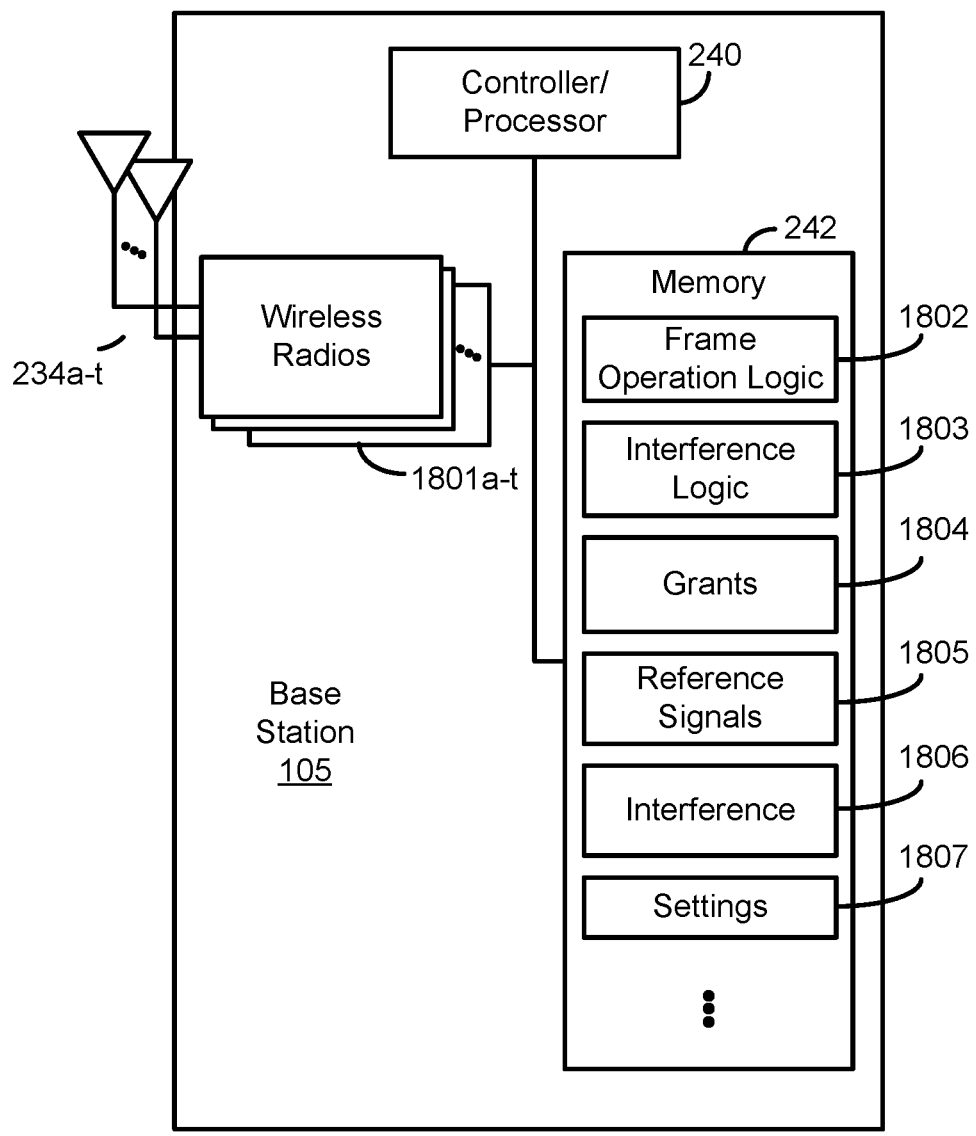
FIG. 18 is a block diagram conceptually illustrating an example design of a network entity.

FIG. 14 is a flowchart illustrating example blocks executed by a network entity. The network entity may include or correspond to a base station or a TRP thereof, configured according to an aspect of the present disclosure. The example blocks will also be described with respect to a network entity as illustrated in FIG. 18. FIG. 18 is a block diagram conceptually illustrating an example design of a particular network entity, base station 105 (such as a gNB or eNB). FIG. 18 illustrates a base station 105, also referred to as gNB 105, configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1801*a-t* and antennas 234*a-r*. Wireless radios 1801*a-t* includes various components and hardware, as illustrated in FIG. 2 for gNB 105, including modulator/demodulators 232*a-t*, MIMO detector 236, receive processor 238, transmit processor 220, and TX MIMO processor 230. The data 1802-1807 in memory 242 may include or correspond to the corresponding data 1702-1707 in memory 282, respectively.

Referring to FIG. 14, at block 1400, a network entity, such as gNB 105, transmits one or more pre-grant transmissions, where each pre-grant transmission is sent via a beam of a plurality of beams and the plurality of beams are in a millimeter wave frequency range, similar to block 1300. For example, one pre-grant transmission is transmitted on each beam of the plurality of beams. The plurality of beams may include or correspond to each beam that the network entity plans to use or determines is available to use.

At block 1401, the gNB 105 receives one or more reference signal, responsive to the one or more pre-grant transmissions, similar to block 1301. In some implementations, the one or more reference signal include or correspond to uplink reference signal transmissions, such as SRS transmissions or DMRS transmissions. The network entity may receive multiple reference signals transmissions from one or more UEs of multiple UEs. Additionally, or alternatively, the network entity may transmit one or more second reference signal transmissions, such as CSI-RS transmissions for receiving uplink data.

At block 1402, the gNB 105 determines interference for each reference signal of the one or more reference signals. For example, the Interference Calculator 416 of FIG. 4 determines an interference value for each reference signal transmission. The Interference Calculator 416 (or Interference Logic 1803 of FIG. 18) may determine a beam interference value for each reference signal using one or more of the techniques described with reference to FIG. 11.

At block 1403, the gNB 105 determines whether to transmit data for the one or more pre-grant transmissions based on the interference for each reference signal. For example, the frame based operation logic 1802 determines whether to transmit data based on the determined interference values, such as described with reference to FIGS. 4 and 5.

At block 1404, the gNB 105 optionally transmits one or more grant transmissions based on determining that the interference for a reference signal of the one or more reference signals satisfied a transmission condition. For example, the frame based operation logic 1802 determines whether to transmit data based on comparing the determined interference value, for a corresponding reference signal transmission, to a threshold, such as described with reference to FIGS. 4 and 5. Based on determining to transmit data, the gNB 105 sends one or more grant transmissions to signal the data transmission.

At block 1405, the gNB 105 transmits a data transmission via a particular beam of the plurality of beams based on the one or more grant transmissions. For example, the frame based operation logic 1802 causes a data transmission to be sent by a particular transmitting beam based on a resource or resources indicated by the one or more grant transmissions, such as described with reference to FIGS. 4 and 5. The particular beam used to transmit the data transmissions corresponds to a particular receive beam used to receive the particular reference signal transmission of the one or more reference signal transmissions. Multiple data transmissions may be sent in some implementations, such as when the interference of multiple receive beams satisfies the threshold.

In some implementations, the gNB 105 may execute one or more additional blocks, such as to perform one or more other operations described herein. For example, in some implementations, determining the interference for each reference signal transmission includes: generating a beam interference value for a corresponding beam of each reference signal transmission of the one or more reference signal transmissions; comparing the beam interference values to a beam interference threshold; and determining whether to transmit data via a particular beam based on the corresponding beam interference value exceeding the beam interference threshold.

In some implementations, generating the beam interference value may include multiplying a transmission power of the UE 115 and a link gain between the gNB 105 and the UE 115 to estimate the beam interference value. Alternatively, generating the beam interference value may include determining an adjusted transmission power based on a transmission power setting of the UE 115 and power headroom information of the UE 115; and multiplying the adjusted transmission power and a link gain between the gNB 105 and the UE 115 to estimate the beam interference value, where the beam interference value is an adjusted strength of the interference RSRP. In some implementations, the method includes refraining, by the network entity, from performing a channel sensing operation corresponding to the data transmission.

In some implementations, the method can include determining, by the network entity, type information indicating a type or class of UE; and retrieving, by the network entity, power headroom information based on the type information. Additionally, or alternatively, the method can include transmitting, by the network entity, a request message to a second network entity indicating a request for power headroom information; and receiving, by the network entity, a response message from the second network entity indicating the power headroom information.

In some implementations, the network entity may signal frame configuration information to indicate traffic directions, such as UL or DL. For example, additional blocks executed by the gNB 105 may include transmitting, by the network entity, frame configuration information indicating a transmission direction for each slot of one or more frames. As another example, additional blocks executed by the gNB 105 may include transmitting, by the network entity, dynamic frame configuration information indicating a transmission direction preference for each slot of a particular frame.

FIG. 15 is a flowchart illustrating another example of blocks executed by a UE. The example blocks will also be described with respect to the UE 115 as illustrated in FIG. 17 and as described above. Referring to FIG. 15, at block 1500, the UE 115 receives one or more pre-grant transmissions via a beam of a plurality of beams. In some implementations, the one or more pre-grant transmissions include or correspond to pre-grant transmissions. Additionally, or alternatively, the one or more pre-grant transmissions include corresponding UE-IDs. The UE-ID may indicate or identify a particular UE for which the grant is intended. To illustrate, a UE may decode or determined the UE-ID of a grant transmission to determine if the UE needs to decode or process the grant transmission further.

At block 1501, the UE 115 monitors for one or more transmissions based on the one or more pre-grant transmission. In some implementations, the one or more transmissions include or correspond to reference signal transmissions or channel information transmissions, such as CSI-RS transmissions or DMRS transmissions.

At block 1502, the UE 115 determines interference for each transmission of the one or more transmissions. For example, the UE determines an interference for each link associated with a reference signal transmission or a channel information transmission or each beam associated with a reference signal transmission or a channel information transmission.

At block 1503, the UE 115 determines whether to transmit data for the one or more pre-grant transmissions based on the interference for each transmission. For example, the UE compares an estimated interference value of a received reference signal transmission to a threshold value. The threshold value may be statically configured, semi-statically configured, or dynamically configured. For example, when statically configured the threshold value may be set by a network, region, or standard. The value may be set upon connection to the network or prior to connection to the network. When semi-statically configured multiple threshold values may be set by a network, region, or standard and the UE may determine which value to use based on which value was most recently received or based on one or more other UE based determinations, such as channel quality, UE type, etc. The multiple values may be received upon connection to the network or over time while the UE is connected, such as in RRC or DCI messages. When dynamically configured the threshold value may be indicated by or included in a message which schedules or configures the data transmission. For example, each pre-grant transmission may indicate a corresponding threshold value to use.

At block 1504, the UE 115 transmits a data transmission via a particular beam of the plurality of beams based on determining that the interference for a particular transmission of the one or more transmissions satisfied a transmission condition. For example, the UE transmits data based on the estimated interference value exceeding a quality based threshold value. As another example, the UE does not transmit data based on the estimated interference value not exceeding the quality based threshold value. Alternatively, the UE transmits data based on the estimated interference value not exceeding an interference based threshold value and does not transmit data based on the estimated interference value not exceeding the interference based threshold value.

FIG. 16 is a flowchart illustrating another example of blocks executed by a network entity. The network entity may include or correspond to a base station or a TRP thereof, configured according to an aspect of the present disclosure. The example blocks will also be described with respect to base station 105 (such as a gNB 105) as illustrated in FIG. 18. Referring to FIG. 16, at block 1600, a network entity, such as gNB 105, transmits one or more pre-grant transmissions, where each pre-grant transmission is transmitted via a beam of a plurality of beams similar to as described with reference to block 1400.

At block 1601, the gNB 105 transmits one or more transmissions based on the one or more pre-grants transmissions, similar to as described with reference to block 1501. In some implementations, the transmissions include or correspond to reference signal transmissions or channel information transmissions, such as CSI-RS transmissions. In some other implementations, the reference signal includes or corresponds to a DMRS. As an illustrative example, based on a UE-ID, grants, or a combination thereof, of the pre-grants transmissions, the network entity may generate and transmit reference signal transmissions to be used by another device to calculate interference for transmissions by the other device.

At block 1602, the gNB 105 receives a data transmission via a particular beam of the plurality of beams responsive to the one or more transmissions, similar to as described with reference to block 1504. For example, the network entity receives uplink data from the UE when the link between the UE and the network entity satisfies one or more conditions, such as interference conditions, quality conditions, or both. In some implementations, the network entity may receive uplink data from multiple UEs. To illustrate, a first link between the network entity and a first UE and a second link between the network entity and a second UE may both satisfy corresponding thresholds and both UEs may transmit data to the network entity. The data may be transmitted sequentially (such as one after another) or at least partially concurrently (such as partially overlapping transmissions). Alternatively, the network entity may not receive uplink data from any UEs. To illustrate, when the links between the network entity and UEs are poor, high interference, no UEs may send data.

It is noted that one or more blocks (or operations) described with reference to FIG. 13, 14, 15, or 16 may be combined with one or more blocks (or operations) of another of figure. For example, one or more blocks of FIG. 13 or 14 may be combined with one or more blocks (or operations) of another of FIG. 1, 2, 3, 4, 5, 6, 7, 8, 9, 10A-10D, 11, or 12A-12D. Additionally, or alternatively, one or more operations described above with reference to FIGS. 1-12D may be combined with one or more operations described with reference to FIG. 13, 14, 15, or 16.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein (such as components of FIG. 4, functional blocks of FIGS. 13-16, and modules in FIG. 2) may include processors, electronics devices, hardware devices, electronics components, logical circuits, memories, software codes, firmware codes, etc., or any combination thereof. In addition, features discussed herein relating to components, the functional blocks, and the modules described herein (such as components of FIG. 4, functional blocks of FIGS. 13-16, and modules in FIG. 2) may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In a first aspect, a method of wireless communication at a user equipment (UE), the method including: receiving one or more pre-grant transmissions, where each pre-grant transmission is associated with a beam of a plurality of beams, and where the plurality of beams are in a millimeter wave (mmWave) frequency range; decoding the one or more pre-grant transmissions; determining whether the one or more decoded pre-grant transmissions satisfy one or more quality conditions; transmitting one or more reference signals based on determining that the one or more decoded pre-grant transmissions satisfy the one or more quality conditions; receiving one or more grant transmissions responsive to the one or more reference signals; and receiving a data transmission based on the one or more grant transmissions.

In a second aspect, in combination with the first aspect, the method further includes refraining from performing a channel sensing operation corresponding to the data transmission.

In a third aspect, in combination with one or more of the first and second aspects, the UE is operating in unlicensed or shared spectrum.

In a fourth aspect, in combination with one or more of the first through third aspects, the UE is operating in a frame based operation mode, where frames of the UE are time aligned with corresponding frames of one or more network entities, and where frames of the frame based operation mode have a fixed duration for the one or more network entities.

In a fifth aspect, in combination with one or more of the first through fourth aspects, receiving the one or more pre-grant transmissions includes: receiving a first set of pre-grant transmissions from a first network entity; and receiving a second set of pre-grant transmissions from a second network entity.

In a sixth aspect, in combination with one or more of the first through fifth aspects, the first set of pre-grant transmission are received via corresponding downlink beams for the first network entity.

In a seventh aspect, in combination with one or more of the first through sixth aspects, the one or more pre-grant transmissions include UE identifiers (UE-IDs), the UE-IDs configured to indicate an intended UE of the one or more pre-grant transmissions.

In an eighth aspect, in combination with one or more of the first through seventh aspects, the one or more pre-grant transmissions comprise Physical Downlink Control Channel (PDCCH) transmissions, and where each of the PDCCH transmissions include a demodulation reference signal (DMRS).

In a ninth aspect, in combination with one or more of the first through eighth aspects, the one or more reference signals include sounding reference signal (SRS) transmissions, each SRS transmission including a UE specific SRS.

In a tenth aspect, in combination with the ninth aspect, each SRS transmission is transmitted via a corresponding uplink beam of a plurality of uplink beams.

In an eleventh aspect, an apparatus for wireless communication, includes: at least one processor; and a memory coupled to the at least one processor, where the at least one processor is configured to: receive one or more pre-grant transmissions, where each pre-grant transmission is associated with a beam of a plurality of beams, and where the plurality of beams are in a millimeter wave (mmWave) frequency range; decode the one or more pre-grant transmissions; determine whether the one or more decoded pre-grant transmissions satisfy one or more quality conditions; transmit one or more reference signals based on determining that the one or more decoded pre-grant transmissions satisfy the one or more quality conditions; receive one or more grant transmissions responsive to the one or more reference signals; and receive a data transmission based on the one or more grant transmissions.

In a twelfth aspect, in combination with the eleventh aspect, the one or more quality conditions include a signal-to-noise ratio (SINR) condition, a received signal reference power (RSRP) condition, an energy metric condition, or a combination thereof.

In a thirteenth aspect, in combination with one or more of the eleventh and twelfth aspects, the one or more quality conditions correspond to an interference received signal reference power (RSRP) condition, and where a network entity does not transmit data when an interference RSRP is greater than or equal to a threshold.

In a fourteenth aspect, in combination with one or more of the eleventh through thirteenth aspects, the one or more quality conditions correspond to a power adjusted interference strength received signal reference power (RSRP) condition, and where a network entity does not transmit data when a power adjusted interference RSRP is greater than or equal to a threshold.

In a fifteenth aspect, in combination with one or more of the eleventh through fourteenth aspects, the at least one processor is further configured to: transmit current power headroom information, the current power headroom information configured to enable network interference determination.

In a sixteenth aspect, in combination with one or more of the eleventh through fifteenth aspects, the one or more pre-grant transmissions are received from a first network entity for a first frame, and where the at least one processor is further configured to: receive one or more second pre-grant transmissions from the first network entity for a second frame; determine whether to transmit one or more second reference signals to the first network entity based on whether the one or more second pre-grant transmissions satisfy the one or more quality conditions; and refrain from transmitting the one or more second reference signals to the first network entity based on the one or more second pre-grant transmissions failing to satisfy the one or more quality conditions.

In a seventeenth aspect, in combination with one or more of the eleventh through sixteenth aspects, the at least one processor is further configured to: receive one or more third pre-grant transmissions from a second network entity for the second frame; determine whether to transmit one or more third reference signals to the second network entity based on whether the one or more third pre-grant transmissions satisfy the one or more quality conditions; and transmit the one or more third reference signals to the second network entity based on the one or more third pre-grant transmissions satisfying the one or more quality conditions.

In an eighteenth aspect, in combination with one or more of the eleventh through seventeenth aspects, the one or more pre-grant transmissions are received from a first network entity for a particular frame, and where the at least one processor is further configured to: receive one or more second pre-grant transmissions from a second network entity for the particular frame; transmit one or more second reference signals to the second network entity based on whether the one or more second pre-grant transmissions satisfy the one or more quality conditions; and monitor for a second data transmission from the second network entity during the particular frame, where no data is received from the second network entity during the particular frame.

In a nineteenth aspect, in combination with one or more of the eleventh through eighteenth aspects, the one or more pre-grant transmissions are received from a first network entity for a particular frame, and where the at least one processor is further configured to: receive one or more second pre-grant transmissions from a second network entity for the particular frame; and refrain from transmitting second reference signals to the second network entity based on the one or more second pre-grant transmissions failing to satisfy the one or more quality conditions.

In a twentieth aspect, in combination with one or more of the eleventh through nineteenth aspects, the one or more pre-grant transmissions are received from a first network entity, where the one or more pre-grant transmissions include downlink pre-grant transmission and uplink pre-grant transmissions, and where the at least one processor is further configured to: monitor for one or more second reference signals based on the uplink pre-grant transmissions; determine interference for each second reference signal of the one or more second reference signals; determine whether to transmit uplink data for each uplink pre-grant transmissions based on the interference for each second reference signal; and transmit second data transmissions via corresponding beams based on determining that the interference satisfied a transmission condition.

In a twenty-first aspect, in combination with the twentieth aspect, the one or more second reference signal include downlink reference signal transmissions, and where the downlink reference signal transmissions include channel state information (CSI) reference signals (CSI-RS) transmissions.

In a twenty-second aspect, a method of wireless communication by a network entity, including: transmitting one or more pre-grant transmissions, where each pre-grant transmission is sent via a beam of a plurality of beams, where the plurality of beams are in a millimeter wave (mmWave) frequency range; receiving one or more reference signals responsive to the one or more pre-grant transmissions; determining interference for each reference signal of the one or more reference signals; determining whether to transmit data for the one or more pre-grant transmissions based on the interference for each reference signal; transmitting one or more grant transmissions based on determining that the interference for a particular reference signal of the one or more reference signals satisfied a transmission condition; and transmitting a data transmission via a particular beam of the plurality of beams based on the one or more grant transmissions.

In a twenty-third aspect, in combination with the twenty-first aspect, determining the interference for each reference signal includes: generating a beam interference value for a corresponding beam of each reference signal transmission of the one or more reference signals; comparing the beam interference values to a beam interference threshold; and determining whether to transmit the data via the particular beam based on the corresponding beam interference value not exceeding the beam interference threshold.

In a twenty-fourth aspect, in combination with the twenty-third aspect, generating the beam interference value includes multiplying a transmission power of a user equipment (UE) and a link gain between the apparatus and the UE to estimate the beam interference value, and where the transmission condition includes one or more beam interference thresholds.

In a twenty-fifth aspect, in combination with the twenty-third aspect, generating the beam interference value includes: determining an adjusted transmission power based on a transmission power setting of a user equipment (UE) and power headroom information of the UE; and multiplying the adjusted transmission power and a link gain between the apparatus and the UE to estimate the beam interference value, where the beam interference value is an adjusted reference signal received power (RSRP) interference value.

In a twenty-sixth aspect, an apparatus for wireless communication, including: at least one processor; and a memory coupled to the at least one processor, where the at least one processor is configured to: transmit one or more pre-grant transmissions, where each pre-grant transmission is sent via a beam of a plurality of beams, where the plurality of beams are in a millimeter wave (mmWave) frequency range; receive one or more reference signals responsive to the one or more pre-grant transmissions; determine interference for each reference signal of the one or more reference signals; determine whether to transmit data for the one or more pre-grant transmissions based on the interference for each reference signal; transmit one or more grant transmissions based on determining that the interference for a particular reference signal of the one or more reference signals satisfied a transmission condition; and transmit a data transmission via a particular beam of the plurality of beams based on the one or more grant transmissions.

In a twenty-seventh aspect, in combination with the twenty-sixth aspect, the apparatus is a first network entity operating in a time-division multiplexing (TDM) mode, and where the at least one processor is further configured to: receive timing information from a second network entity indicating occupied transmission time of a particular frame; transmit second data during another period of time of the particular frame; and refrain from transmitting the second data during the occupied transmission time of the particular frame.

In a twenty-eighth aspect, in combination with one or more of the twenty-sixth and twenty-seventh aspects, the at least one processor is further configured to: transmit frame configuration information indicating a transmission direction for each slot of one or more frames or dynamic frame configuration information indicating a transmission direction preference for each slot of a particular frame.

In a twenty-ninth aspect, in combination with one or more of the twenty-sixth through twenty-eighth aspects, the at least one processor is further configured to: refrain from performing a channel sensing operation corresponding to the data transmission.

In a thirtieth aspect, in combination with one or more of the twenty-sixth through twenty-ninth aspects, the apparatus is a network entity operating in a frame based operation mode, where frames of the network entity are time aligned with corresponding frames of one or more other network entities, and where frames of the frame based operation mode have a fixed duration for the one or more other network entities.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a user equipment (UE), comprising:
receiving one or more pre-grant transmissions during a contention period, wherein each pre-grant transmission is associated with a beam of a plurality of beams, and wherein the plurality of beams are in a millimeter wave (mmWave) frequency range;
decoding the one or more pre-grant transmissions;

determining, after successfully decoding the one or more pre-grant transmissions, whether the one or more decoded pre-grant transmissions satisfy one or more quality conditions;

transmitting, during the contention period, one or more reference signals based on determining that at least one decoded pre-grant transmissions of the one or more decoded pre-grant transmissions satisfy the one or more quality conditions;

receiving one or more grant transmissions responsive to the one or more reference signals; and receiving a data transmission based on the one or more grant transmissions.

2. The method of claim 1, further comprising refraining from performing a channel sensing operation corresponding to the data transmission, and wherein the data transmission is received after the contention period.

3. The method of claim 1, wherein the UE is operating in unlicensed or shared spectrum.

4. The method of claim 1, wherein the UE is operating in a frame based operation mode, wherein frames of the UE are time aligned with corresponding frames of one or more network entities, and wherein frames of the frame based operation mode have a fixed duration for the one or more network entities.

5. The method of claim 1, wherein receiving the one or more pre-grant transmissions includes:
   receiving a first set of pre-grant transmissions from a first network entity; and
   receiving a second set of pre-grant transmissions from a second network entity.

6. The method of claim 5, wherein the first set of pre-grant transmission are received via corresponding downlink beams for the first network entity.

7. The method of claim 1, wherein the one or more pre-grant transmissions include UE identifiers (UE-IDs), the UE-IDs configured to indicate an intended UE of the one or more pre-grant transmissions.

8. The method of claim 1, wherein the one or more pre-grant transmissions comprise Physical Downlink Control Channel (PDCCH) transmissions, and wherein each of the PDCCH transmissions include a demodulation reference signal (DMRS).

9. The method of claim 1, wherein the one or more reference signals comprise sounding reference signal (SRS) transmissions, each SRS transmission including a UE specific SRS.

10. The method of claim 9, wherein each SRS transmission is transmitted via a corresponding uplink beam of a plurality of uplink beams.

11. An apparatus for wireless communication, comprising:
   at least one processor; and
   a memory coupled to the at least one processor,
   wherein the at least one processor is configured to:
      receive one or more pre-grant transmissions during a contention period, wherein each pre-grant transmission is associated with a beam of a plurality of beams, and wherein the plurality of beams are in a millimeter wave (mmWave) frequency range;
      decode the one or more pre-grant transmissions;
      determine, after successfully decoding the one or more pre-grant transmissions, whether the one or more decoded pre-grant transmissions satisfy one or more quality conditions;
      transmit, during the contention period, one or more reference signals based on determining that at least one decoded pre-grant transmissions of the one or more decoded pre-grant transmissions satisfy the one or more quality conditions;
      receive one or more grant transmissions responsive to the one or more reference signals; and
      receive a data transmission based on the one or more grant transmissions.

12. The apparatus of claim 11, wherein the one or more quality conditions comprise a signal-to-noise ratio (SINR) condition, a received signal reference power (RSRP) condition, an energy metric condition, or a combination thereof.

13. The apparatus of claim 11, wherein the one or more quality conditions correspond to an interference received signal reference power (RSRP) condition, and wherein a network entity does not transmit data when an interference RSRP is greater than or equal to a threshold.

14. The apparatus of claim 11, wherein the one or more quality conditions correspond to a power adjusted interference strength received signal reference power (RSRP) condition, and wherein a network entity does not transmit data when a power adjusted interference RSRP is greater than or equal to a threshold.

15. The apparatus of claim 11, wherein the at least one processor is further configured to:
   transmit current power headroom information, the current power headroom information configured to enable network interference determination.

16. The apparatus of claim 11, wherein the one or more pre-grant transmissions are received from a first network entity for a first frame, and wherein the at least one processor is further configured to:
   receive one or more second pre-grant transmissions from the first network entity for a second frame;
   determine whether to transmit one or more second reference signals to the first network entity based on whether the one or more second pre-grant transmissions satisfy the one or more quality conditions; and
   refrain from transmitting the one or more second reference signals to the first network entity based on the one or more second pre-grant transmissions failing to satisfy the one or more quality conditions.

17. The apparatus of claim 16, wherein the at least one processor is further configured to:
   receive one or more third pre-grant transmissions from a second network entity for the second frame;
   determine whether to transmit one or more third reference signals to the second network entity based on whether the one or more third pre-grant transmissions satisfy the one or more quality conditions; and
   transmit the one or more third reference signals to the second network entity based on the one or more third pre-grant transmissions satisfying the one or more quality conditions.

18. The apparatus of claim 11, wherein the one or more pre-grant transmissions are received from a first network entity for a particular frame, and wherein the at least one processor is further configured to:
   receive one or more second pre-grant transmissions from a second network entity for the particular frame;
   transmit one or more second reference signals to the second network entity based on whether the one or more second pre-grant transmissions satisfy the one or more quality conditions; and
   monitor for a second data transmission from the second network entity during the particular frame, wherein no data is received from the second network entity during the particular frame.

19. The apparatus of claim 11, wherein the one or more pre-grant transmissions are received from a first network entity for a particular frame, and wherein the at least one processor is further configured to:
  receive one or more second pre-grant transmissions from a second network entity for the particular frame; and
  refrain from transmitting second reference signals to the second network entity based on the one or more second pre-grant transmissions failing to satisfy the one or more quality conditions.

20. The apparatus of claim 11, wherein the one or more pre-grant transmissions are received from a first network entity, wherein the one or more pre-grant transmissions include downlink pre-grant transmission and uplink pre-grant transmissions, and wherein the at least one processor is further configured to:
  monitor for one or more second reference signals based on the uplink pre-grant transmissions;
  determine interference for each second reference signal of the one or more second reference signals;
  determine whether to transmit uplink data for each uplink pre-grant transmissions based on the interference for each second reference signal; and
  transmit second data transmissions via corresponding beams based on determining that the interference satisfied a transmission condition.

21. The apparatus of claim 20, wherein the one or more second reference signals comprise downlink reference signal transmissions, and wherein the downlink reference signal transmissions include channel state information (CSI) reference signals (CSI-RS) transmissions.

22. A method of wireless communication by a network entity, comprising:
  transmitting two or more pre-grant transmissions during a contention period, wherein each pre-grant transmission of the two or more pre-grant transmissions is sent via a different beam of a plurality of beams, and wherein the plurality of beams are in a millimeter wave (mmWave) frequency range;
  receiving one or more reference signals responsive to the two or more pre-grant transmissions during the contention period using two or more beams of the plurality of beams;
  determining interference for each reference signal of the one or more reference signals;
  determining whether to transmit data for at least one pre-grant transmission of the two or more pre-grant transmissions based on the interference for each reference signal;
  transmitting one or more grant transmissions based on determining that the interference for a particular reference signal of the one or more reference signals satisfied a transmission condition; and
  transmitting a data transmission via a particular beam of the plurality of beams based on the one or more grant transmissions.

23. The method of claim 22, wherein determining the interference for each reference signal includes:
  generating a beam interference value for a corresponding beam of each reference signal transmission of the one or more reference signals;
  comparing the beam interference values to a beam interference threshold; and
  determining whether to transmit the data via the particular beam based on the corresponding beam interference value not exceeding the beam interference threshold.

24. The method of claim 23, wherein generating the beam interference value includes multiplying a transmission power of a user equipment (UE) and a link gain between the network entity and the UE to estimate the beam interference value, and wherein the transmission condition includes one or more beam interference thresholds.

25. The method of claim 23, wherein generating the beam interference value includes:
  determining an adjusted transmission power based on a transmission power setting of a user equipment (UE) and power headroom information of the UE; and
  multiplying the adjusted transmission power and a link gain between the network entity and the UE to estimate the beam interference value, wherein the beam interference value is an adjusted reference signal received power (RSRP) interference value.

26. An apparatus for wireless communication, comprising:
  at least one processor; and
  a memory coupled to the at least one processor,
  wherein the at least one processor is configured to:
    transmit two or more pre-grant transmissions during a contention period, wherein each pre-grant transmission of the two or more pre-grant transmissions is sent via a different beam of a plurality of beams, and wherein the plurality of beams are in a millimeter wave (mmWave) frequency range;
    receive one or more reference signals responsive to the two or more pre-grant transmissions during the contention period using two or more beams of the plurality of beams;
    determine interference for each reference signal of the one or more reference signals;
    determine whether to transmit data for at least one pre-grant transmission of the two or more pre-grant transmissions based on the interference for each reference signal;
    transmit one or more grant transmissions based on determining that the interference for a particular reference signal of the one or more reference signals satisfied a transmission condition; and
    transmit a data transmission via a particular beam of the plurality of beams based on the one or more grant transmissions.

27. The apparatus of claim 26, wherein the apparatus is a first network entity operating in a time-division multiplexing (TDM) mode, and wherein the at least one processor is further configured to:
  receive timing information from a second network entity indicating occupied transmission time of a particular frame;
  transmit second data during another period of time of the particular frame; and
  refrain from transmitting the second data during the occupied transmission time of the particular frame.

28. The apparatus of claim 26, wherein transmitting the two or more pre-grant transmissions includes sweeping a particular downlink reference signal multiple times over the plurality of beams or transmitting multiple downlink reference signals using the plurality of beams, and wherein the at least one processor is further configured to:
  transmit frame configuration information indicating a transmission direction for each slot of one or more frames or dynamic frame configuration information indicating a transmission direction preference for each slot of a particular frame.

29. The apparatus of claim 26, wherein the at least one processor is further configured to:
  refrain from performing a channel sensing operation corresponding to the data transmission.

30. The apparatus of claim 26, wherein the apparatus is a network entity operating in a frame based operation mode, wherein frames of the network entity are time aligned with corresponding frames of one or more other network entities, wherein frames of the frame based operation mode have a fixed duration for the one or more other network entities, and wherein the one or more reference signals are received based on at least one pre-grant transmission of the two or more pre-grant transmissions satisfying one or more UE quality conditions.

* * * * *